(12) United States Patent
Alessandrini

(10) Patent No.: US 11,314,959 B1
(45) Date of Patent: Apr. 26, 2022

(54) SYSTEM AND METHOD FOR IDENTIFICATION AND QUANTIFICATION OF TYPES OF FAILURE IN AUTOMATED READING OF BARCODES

(71) Applicant: DATALOGIC IP TECH S.R.L., Calderara di Reno (IT)

(72) Inventor: Martino Alessandrini, Bologna (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 17/364,031

(22) Filed: Jun. 30, 2021

(51) Int. Cl.
*G06K 7/10* (2006.01)
*G06K 9/22* (2006.01)
*G06K 19/06* (2006.01)
*G06K 7/14* (2006.01)

(52) U.S. Cl.
CPC ......... *G06K 7/1465* (2013.01); *G06K 7/1456* (2013.01); *G06K 7/1491* (2013.01)

(58) Field of Classification Search
CPC ... G06K 7/1465; G06K 7/1456; G06K 7/1491
See application file for complete search history.

(56) References Cited

U.S. PATENT DOCUMENTS

| | | | |
|---|---|---|---|
| 7,028,903 B2 | 4/2006 | Reichenbach et al. | |
| 7,028,905 B2 * | 4/2006 | Sato | G06F 1/1626 235/462.45 |
| 7,215,835 B2 | 5/2007 | Reichenbach et al. | |
| 7,757,951 B2 * | 7/2010 | Mazowiesky | G06K 17/00 235/440 |
| 9,939,381 B1 * | 4/2018 | Kimmel | G01N 21/6458 |
| 10,599,902 B2 | 3/2020 | Bachelder et al. | |
| 10,628,648 B2 | 4/2020 | Negro et al. | |
| 10,853,613 B2 | 12/2020 | Wehrle et al. | |
| 2006/0140445 A1 * | 6/2006 | Cusack, Jr. | G06K 9/00261 382/103 |
| 2013/0050517 A1 * | 2/2013 | Fan | G06K 9/00 348/208.99 |

(Continued)

OTHER PUBLICATIONS

Y. Zhang and H. Yu, "Convolutional Neural Network Based Metal Artifact Reduction in X-Ray Computed Tomography," in IEEE Transactions on Medical Imaging, vol. 37, No. 6, pp. 1370-1381, Jun. 2018 (36 pages).

(Continued)

*Primary Examiner* — Tuyen K Vo
(74) *Attorney, Agent, or Firm* — The Juhasz Law Firm

(57) ABSTRACT

A processor is configured to: analyze multiple read paths of multiple read operations to identify a cluster of read operations associated with attempts to read encoded data of a first barcode; analyze results of the cluster of read operations to identify successful read operations; in response to at least one successful read operation, provide the successfully read encoded data to another device; and in response to a lack of success among the cluster of read operations, analyze the results of the cluster of read operations to identify any read operation in which both a start end and a stop end of the first barcode were successfully read, and store, as part of a set of indications of read failures for a set of barcodes that includes the first barcode, an indication of at least whether both the start end and the stop end of the first barcode were successfully read.

20 Claims, 21 Drawing Sheets

(56) References Cited

U.S. PATENT DOCUMENTS

2016/0300091 A1\* 10/2016 Cumoli ............ G06K 19/06028

OTHER PUBLICATIONS

Hopcroft, J.; Tarjan, R. (1973), "Algorithm 447: efficient algorithms for graph manipulation", Communications of the ACM, 16 (6): 372-378 (7 pages).
Cognex Corporation, Natick, MA, Cognex EDGE product brochure, downloaded from https://www.cognex.com/solutions/edge-intelligence Jun. 21, 2021 (8 pages).
Sick AG, Waldkirch, Germany, Sick Sensor Intelligence product brochure, downloaded from https://www.sick.com/it/en/sick-integrationspace/software-for-integration/package-analytics/c/g309559 Jun. 21, 2021 (6 pages).

\* cited by examiner

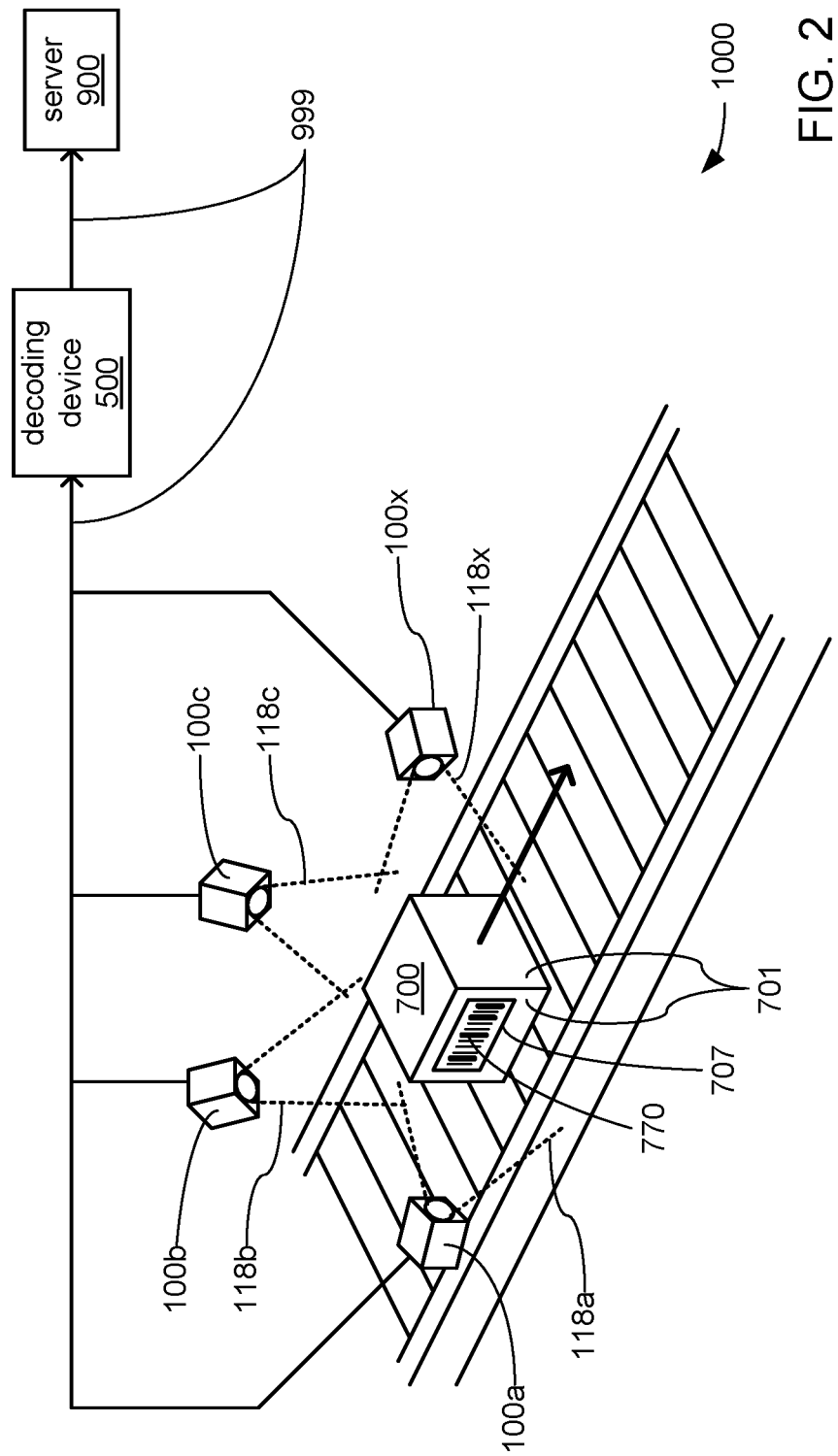

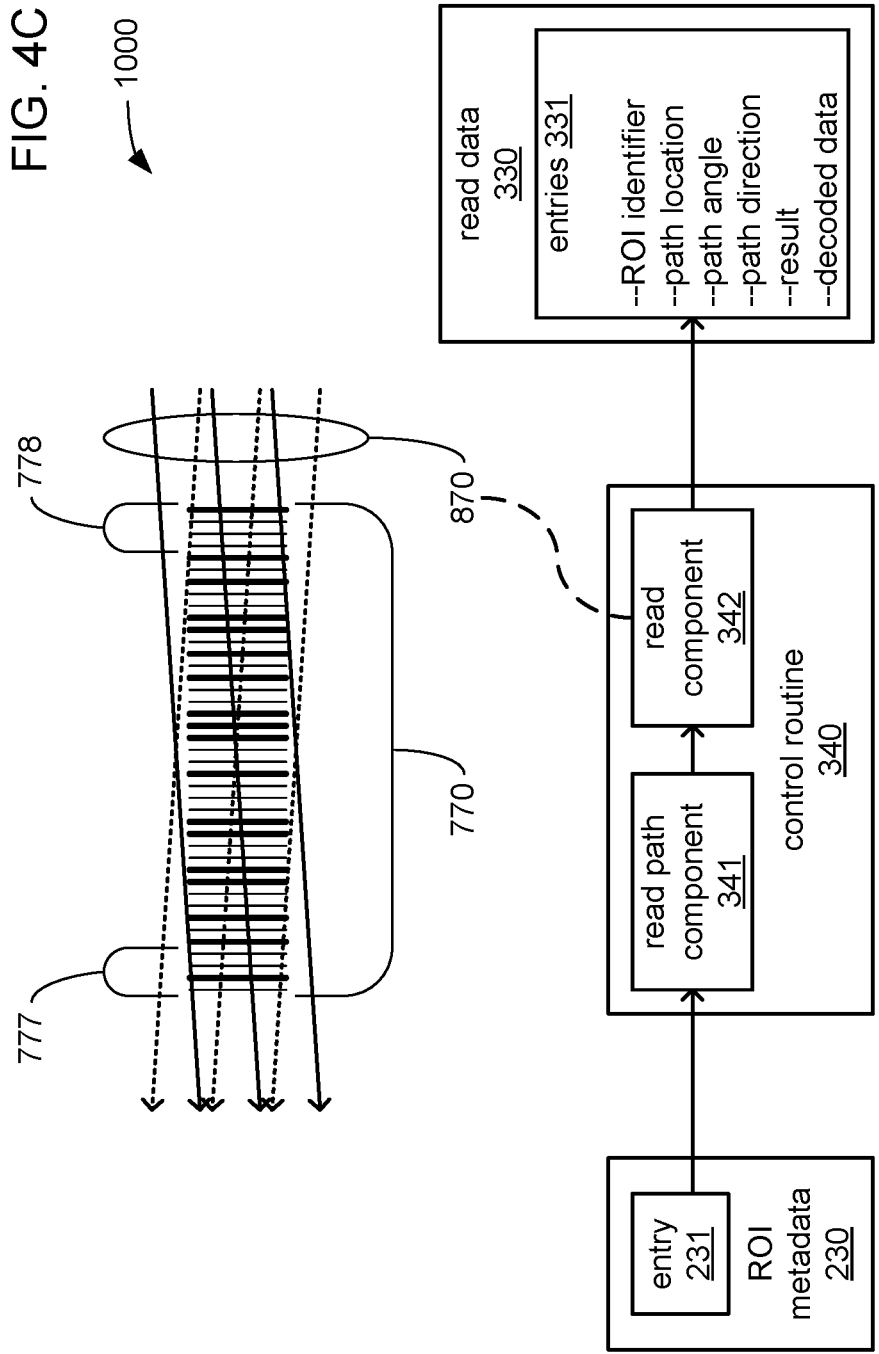

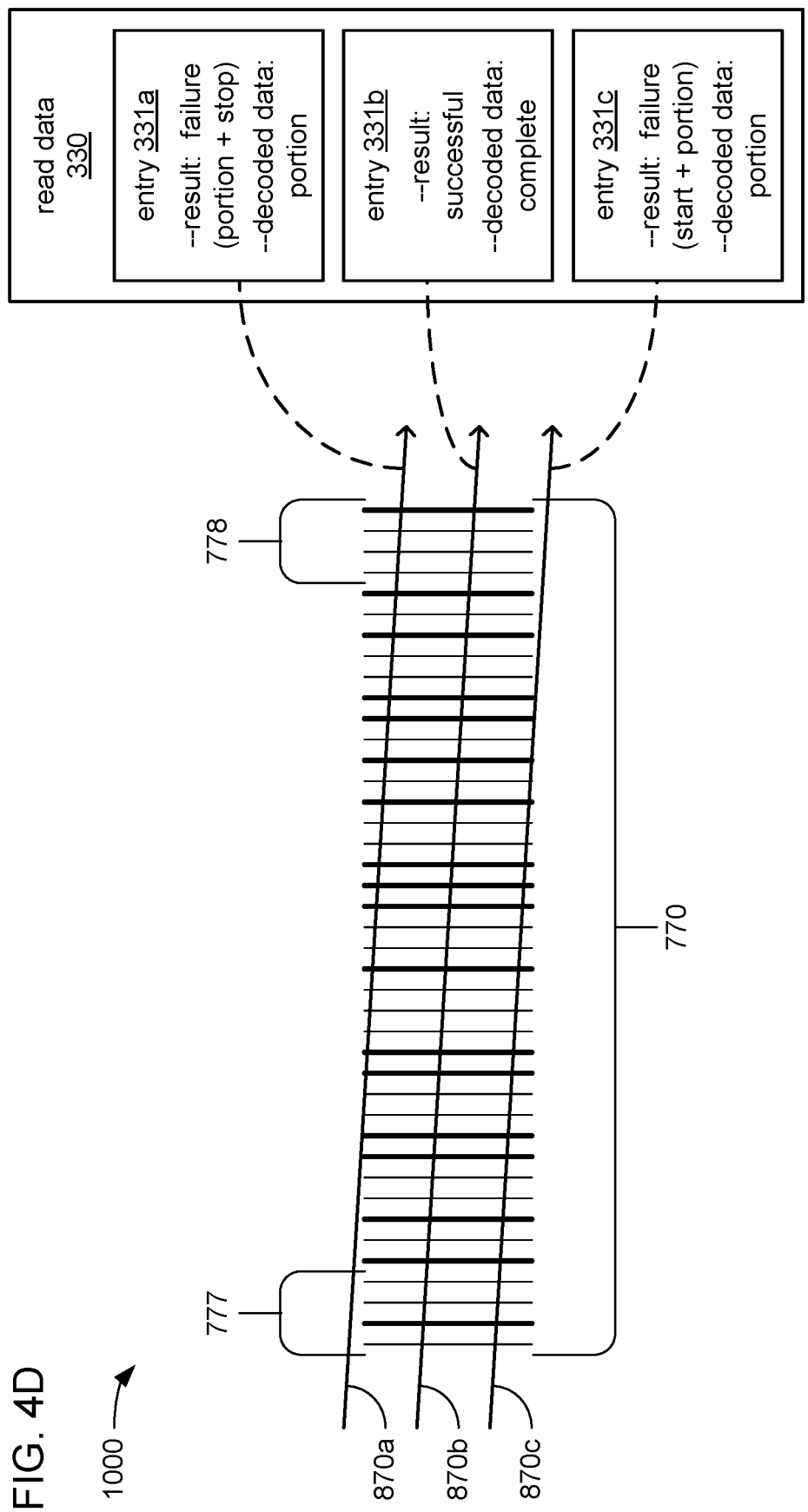

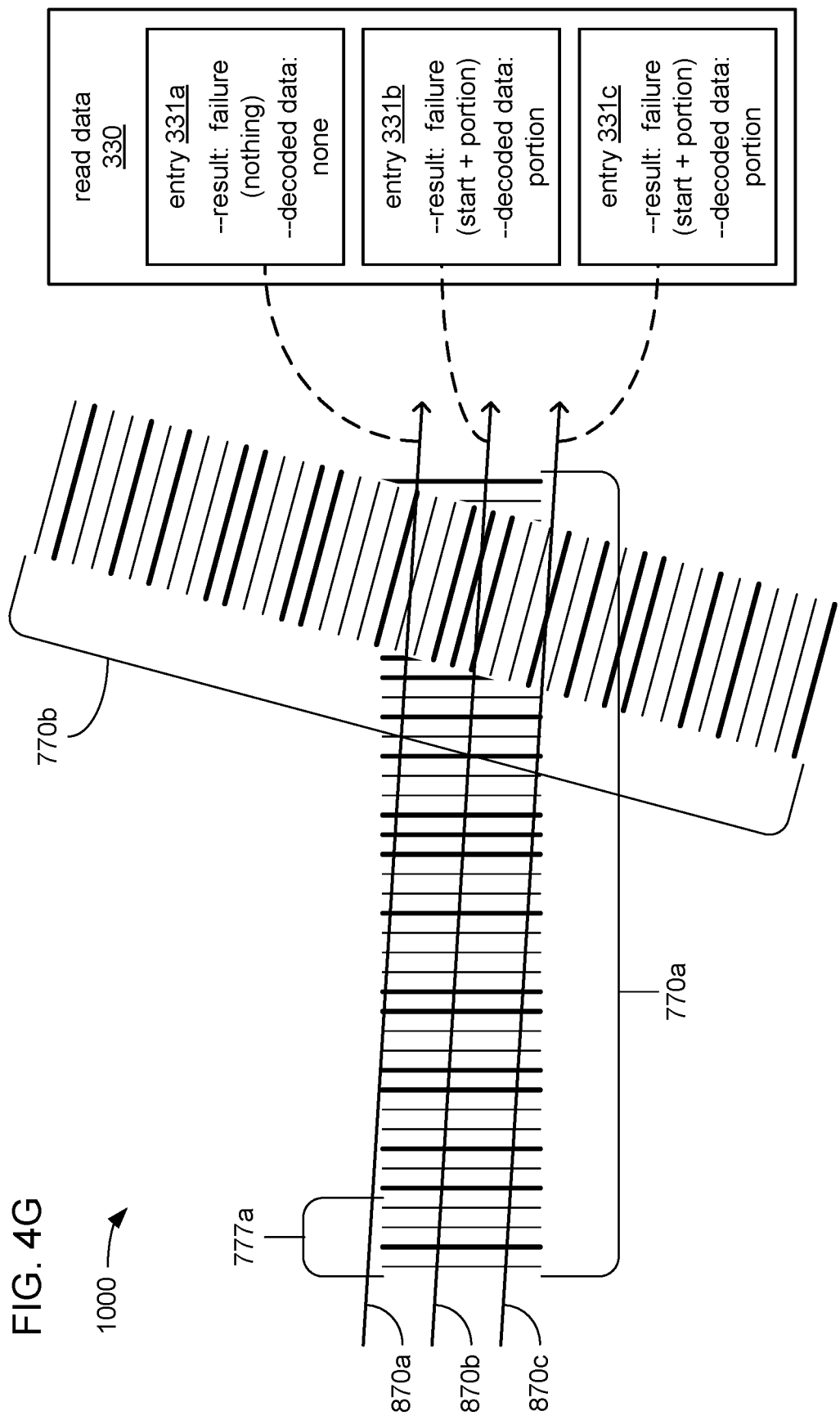

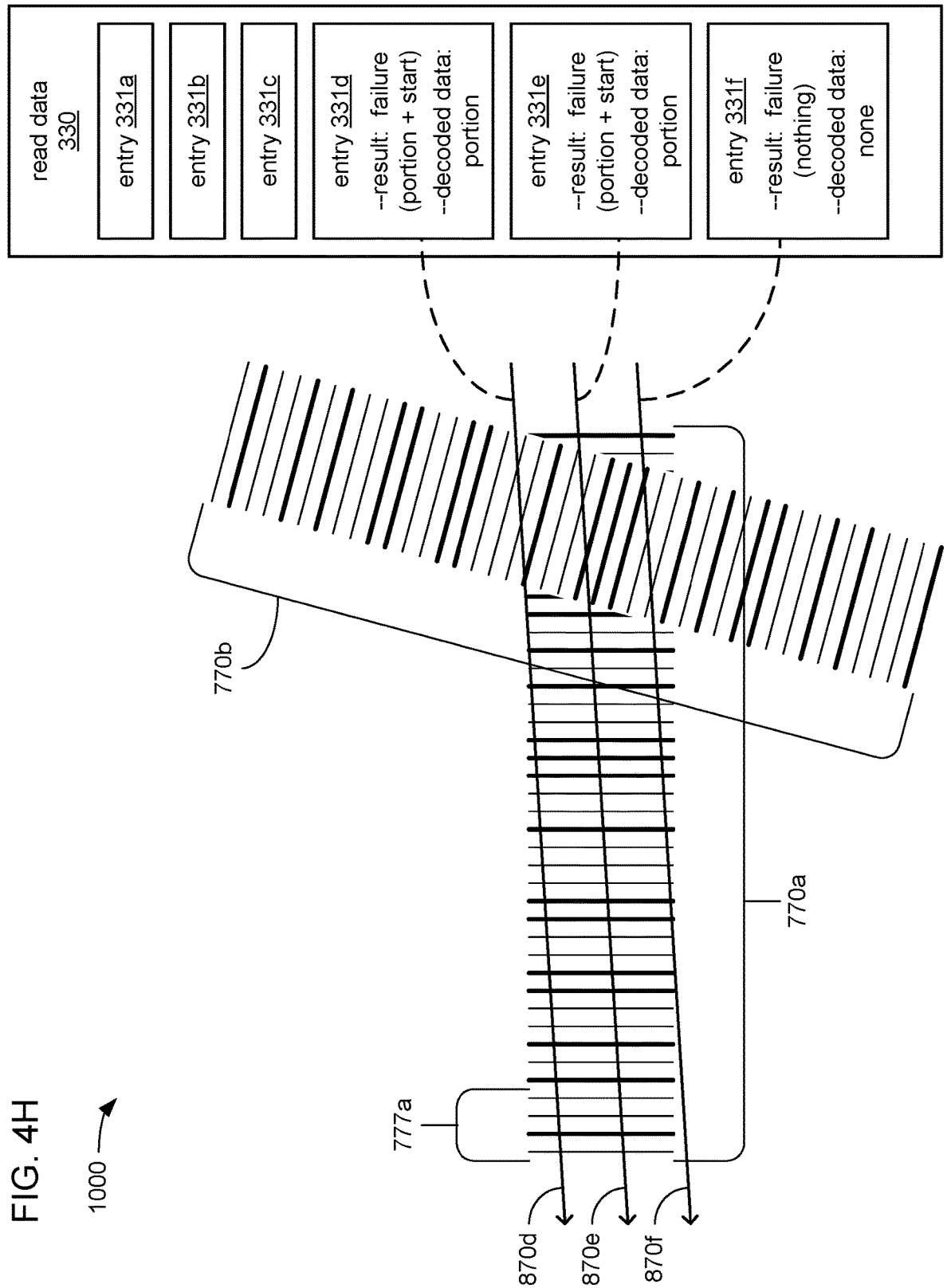

SYSTEM AND METHOD FOR IDENTIFICATION AND QUANTIFICATION OF TYPES OF FAILURE IN AUTOMATED READING OF BARCODES

BACKGROUND

1. Technical Field

The present disclosure relates to increasing efficiency and ease of use of machine vision systems.

2. Description of the Related Art

The application of encoded data markings that encode data, such as indicia (e.g., barcodes, QR codes, etc.), digital watermarks and/or human-readable text, to a surface of an object for subsequent capture and decoding to retrieve data encoded therein is well known. Also well known is the use of one or more cameras to capture image(s) of one or more of such surfaces in an effort to capture image(s) of one or more encoded data markings for decoding.

Each of such cameras may be a stationary camera positioned to cover a location at which an object bearing one or more of such encoded data markings may be placed and/or through which such an object may be transported. By way of example, one or more of such cameras may be positioned to place a doorway or portion of the interior of a warehouse within a field of view (FOV) of each camera to enable the capture of one or more encoded data markings carried on one or more surfaces of an object (e.g., a box, a crate, a palletized load, etc.) as the object is transported into the warehouse, is stored within the portion of the warehouse, and/or is transported out of the warehouse. By way of another example, one or more of such cameras may be positioned along the path of a conveyor belt or other device along which such an object that carries such encoded data markings on one or more surfaces thereof may be moved.

As will be familiar to those skilled in the art, searching through a captured image to identify each such encoded data marking, and then interpreting each identified encoded data marking to decode the data encoded therein are typically processing-intensive tasks. Also, in situations in which multiple objects may be moved through the FOV(s) of one or more cameras (e.g., where camera(s) are positioned to cover a path through a doorway or the path of a conveyor belt), there may be a relatively small amount of time between instances of an object passing through those FOV(s), thereby providing only a relatively small amount of time during which each encoded data marking that may be carried on surface(s) of each object must be identified and decoded.

The combination of high demand for processing resources and limited time in which to perform such operations as identifying and interpreting each encoded data marking often leaves little or no opportunity to take action in response to situations in which one or more encoded data markings are unable to be interpreted. More specifically, there is often little or no opportunity to take action to address situations in which attempts to perform automated reading operations on one-dimensional indicia (e.g., barcodes) are unsuccessful. In such a situation, an object carrying one or more unreadable barcodes may need to be manually handled and examined by personnel to attempt to address whatever issue may be preventing successful automated barcode reading. As will be familiar to those skilled in the art, such involvement of personnel may prove very time consuming, such that the benefits of the use of automation in reading barcodes may be largely negated.

As will be familiar to those skilled in the art, any of a variety of circumstances may thwart attempts to perform automated readings of barcodes, including and not limited to: placement of objects causing severe skewing of surfaces that carry barcodes, lighting glare, ripped or folded stickers that carry barcodes, overwriting or overlapping of barcodes, dirt or scuff marks on surfaces that carry barcodes, etc. Some of such circumstances may be features of the processes and/or the circumstances of the system in which the reading of barcodes occurs such that there may be frequent recurrences resulting in system inefficiencies that prevent the overall system from working as smoothly as it should. Addressing such circumstances may require identifying and quantifying differing types of barcode read failure.

Thus, an approach is needed for efficiently identifying and quantifying types of barcode read failure in a manner that does not, itself, thwart the efficient automated reading of barcodes.

BRIEF SUMMARY

Technologies are described for making more efficient use of processing resources in identifying and quantifying differing types of barcode read failure in an automated barcode reading system.

A decoding device includes storage configured to store image data comprising a first image captured by a first camera of an object, and a processor communicatively coupled to the storage. The processor is configured to perform operations including: analyze the first image to derive boundaries of a first region of interest (ROI) within which at least one barcode is present, and to identify at least one angle of orientation of the at least one barcode; derive multiple read paths for multiple read operations to be attempted within the first ROI based on the at least one angle of orientation of the at least one barcode; attempt each read operation of the multiple read operations within the first ROI along a different one of the read paths of the multiple read paths to attempt to read data encoded within a first barcode of the at least one barcode; analyze the read path of each read operation of the multiple read operations to identify a first cluster of read operations of the multiple read operations that are associated with attempts to read the first barcode; analyze results of each read operation within the first cluster to identify each read operation in which data encoded within the first barcode was successfully fully read; and in response to at least one read operation within the first cluster resulting in the data encoded within the first barcode being successfully fully read, provide an indication of the data encoded within the first barcode to another device. The processor is also configured to, in response to a lack of success in fully reading the data encoded within the first barcode among the read operations within the first cluster, perform operations including: for each read operation within the first cluster, analyze the results to determine whether a start end of the first barcode was successfully read, and to determine whether a stop end of the first barcode was successfully read; and store, as part of a set of indications of read failures in the storage for a set of barcodes that includes the first barcode, an indication of at least whether both the start end and the stop end of the first barcode were successfully read in any read operation within the first cluster.

A decoding system includes multiple cameras, wherein each camera comprises an image sensor configured to capture an image of multiple images of an object, and a processor communicatively coupled to the multiple cameras. The processor is configured, for each image of the multiple images, to perform operations including: analyze the image to derive boundaries of a region of interest (ROI) within which at least one barcode is present, and to identify at least one angle of orientation of the at least one barcode; derive multiple read paths for multiple read operations to be attempted within the ROI based on the at least one angle of orientation of the at least one barcode; attempt each read operation of the multiple read operations within the ROI along a different one of the read paths of the multiple read paths to attempt to read data encoded within a single barcode of the at least one barcode; analyze the read path of each read operation of the multiple read operations to identify a single cluster of read operations of the multiple read operations that are associated with attempts to read the single barcode; add, to the single cluster, read operations associated with attempts to read the same single barcode within another ROI of within another image of the multiple images; analyze results of each read operation within the single cluster to identify each read operation in which data encoded within the single barcode was successfully fully read; and in response to at least one read operation within the single cluster resulting in the data encoded within the single barcode being successfully fully read, provide an indication of the data encoded within the single barcode to another device. The processor is further configured to, in response to a lack of success in fully reading the data encoded within the single barcode among the read operations within the single cluster, perform operations including: for each read operation within the single cluster, analyze the results to determine whether a start end of the single barcode was successfully read, and to determine whether a stop end of the single barcode was successfully read; and store, as part of a set of indications of read failures in the storage for a set of barcodes that includes the single barcode, an indication of at least whether both the start end and the stop end of the single barcode were successfully read in any read operation within the single cluster.

A method includes: receiving, at a decoding device, image data from a first camera of a first image captured by the first camera of an object; analyzing, by a processor of the decoding device, the first image to derive boundaries of a first region of interest (ROI) within which at least one barcode is present, and to identify at least one angle of orientation of the at least one barcode; deriving, by the processor, multiple read paths for multiple read operations to be attempted within the first ROI based on the at least one angle of orientation of the at least one barcode; attempting each read operation of the multiple read operations within the first ROI along a different one of the read paths of the multiple read paths to attempt to read data encoded within a first barcode of the at least one barcode; analyzing, by the processor, the read path of each read operation of the multiple read operations to identify a first cluster of read operations of the multiple read operations that are associated with attempts to read the first barcode; analyzing, by the processor, results of each read operation within the first cluster to identify each read operation in which data encoded within the first barcode was successfully fully read; and in response to at least one read operation within the first cluster resulting in the data encoded within the first barcode being successfully fully read, providing an indication of the data encoded within the first barcode to another device via a network. The method further includes, in response to a lack of success in fully reading the data encoded within the first barcode among the read operations within the first cluster, performing operations including: for each read operation within the first cluster, analyzing, by the processor, the results to determine whether a start end of the first barcode was successfully read, and to determine whether a stop end of the first barcode was successfully read; and storing, in a storage communicatively coupled to the processor, and as part of a set of indications of read failures for a set of barcodes that includes the first barcode, an indication of at least whether both the start end and the stop end of the first barcode were successfully read in any read operation within the first cluster.

BRIEF DESCRIPTION OF THE DRAWINGS

FIG. 2 shows aspects of an example use of the machine vision system of either FIG. 1A or 1B.

FIGS. 4A, 4B, 4C, 4D, 4E, 4F, 4G and 4H, together, show aspects of attempted reads of barcodes by the decoding system of either FIG. 1A or 1B.

DETAILED DESCRIPTION

Figure 1A:
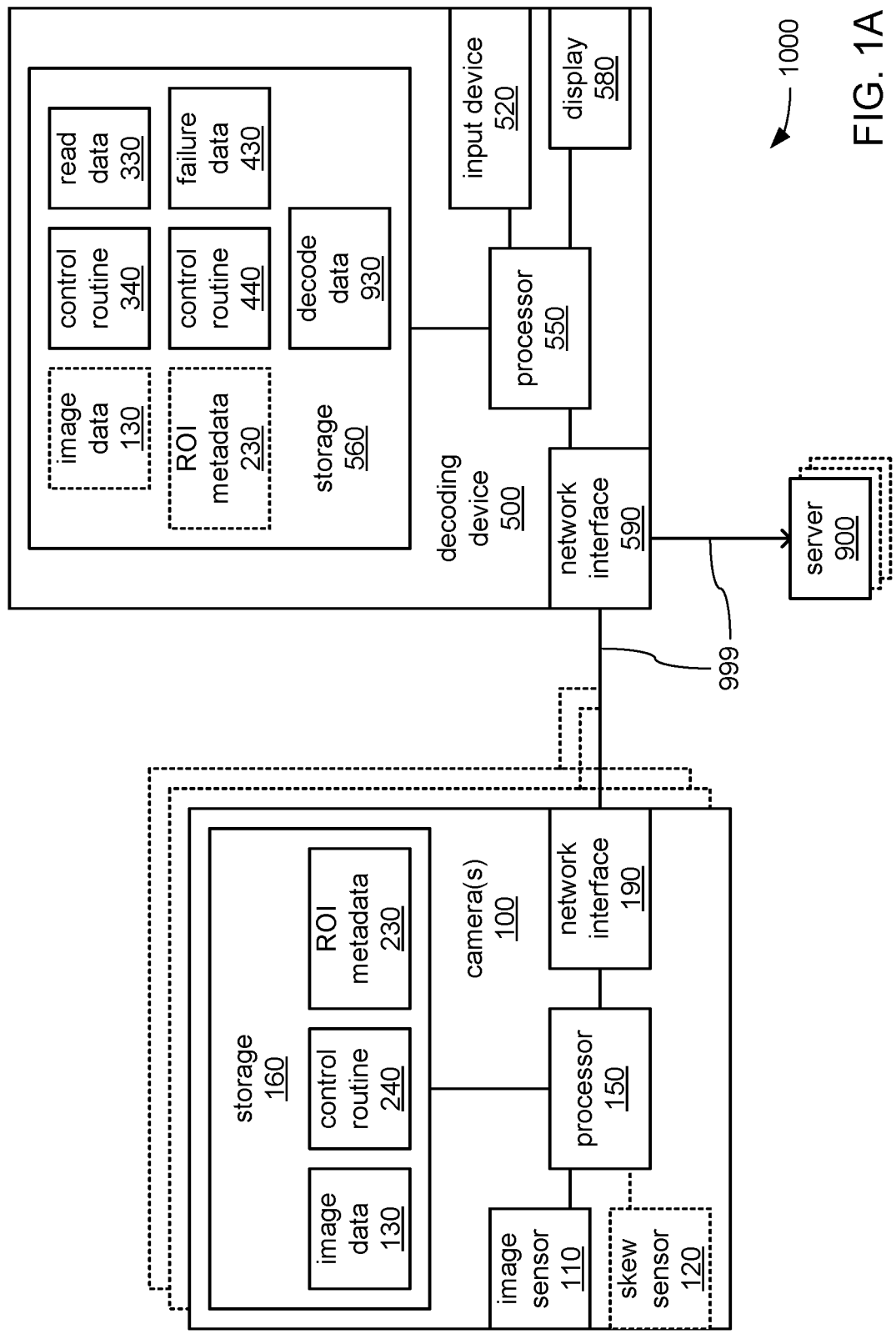
FIGS. 1A and 1B show aspects of alternate example implementations of a machine vision system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system implementing a method for making efficient use of processing resources in the automated identification and quantification of types of barcode read failure. A decoding device includes storage configured to store image data comprising a first image captured by a first camera of an object, and a processor communicatively coupled to the storage. The processor is configured to perform operations including: analyze the first image to derive boundaries of a first region of interest (ROI) within which at least one barcode is present, and to identify at least one angle of orientation of the at least one barcode; derive multiple read paths for multiple read operations to be attempted within the first ROI based on the at least one angle of orientation of the at least one barcode; attempt each read operation of the multiple read operations within the first ROI along a different one of the read paths of the multiple read paths to attempt to read data encoded within a first barcode of the at least one barcode; analyze the read path of each read operation of the multiple read operations to identify a first cluster of read operations of the multiple read operations that are associated with attempts to read the first barcode; analyze results of each read operation within the first cluster to identify each read operation in which data encoded within the first barcode was successfully fully read; and in response to at least one read operation within the first cluster resulting in the data encoded within the first barcode being successfully fully read, provide an indication of the data encoded within the first barcode to another device. The processor is also configured to, in response to a lack of success in fully reading the data encoded within the first barcode among the read operations within the first cluster, perform operations including: for each read operation within the first cluster, analyze the results to determine whether a start end of the first barcode was successfully read, and to determine whether a stop end of the first barcode was successfully read; and store, as part of a set of indications of read failures in the storage for a set of barcodes that includes the first barcode, an indication of at least whether both the start end and the stop end of the first barcode were successfully read in any read operation within the first cluster.

A decoding system includes multiple cameras, wherein each camera comprises an image sensor configured to capture an image of multiple images of an object, and a processor communicatively coupled to the multiple cameras. The processor is configured, for each image of the multiple images, to perform operations including: analyze the image to derive boundaries of a region of interest (ROI) within which at least one barcode is present, and to identify at least one angle of orientation of the at least one barcode; derive multiple read paths for multiple read operations to be attempted within the ROI based on the at least one angle of orientation of the at least one barcode; attempt each read operation of the multiple read operations within the ROI along a different one of the read paths of the multiple read paths to attempt to read data encoded within a single barcode of the at least one barcode; analyze the read path of each read operation of the multiple read operations to identify a single cluster of read operations of the multiple read operations that are associated with attempts to read the single barcode; add, to the single cluster, read operations associated with attempts to read the same single barcode within another ROI of within another image of the multiple images; analyze results of each read operation within the single cluster to identify each read operation in which data encoded within the single barcode was successfully fully read; and in response to at least one read operation within the single cluster resulting in the data encoded within the single barcode being successfully fully read, provide an indication of the data encoded within the single barcode to another device. The processor is further configured to, in response to a lack of success in fully reading the data encoded within the single barcode among the read operations within the single cluster, perform operations including: for each read operation within the single cluster, analyze the results to determine whether a start end of the single barcode was successfully read, and to determine whether a stop end of the single barcode was successfully read; and store, as part of a set of indications of read failures in the storage for a set of barcodes that includes the single barcode, an indication of at least whether both the start end and the stop end of the single barcode were successfully read in any read operation within the single cluster.

A method includes: receiving, at a decoding device, image data from a first camera of a first image captured by the first camera of an object; analyzing, by a processor of the decoding device, the first image to derive boundaries of a first region of interest (ROI) within which at least one barcode is present, and to identify at least one angle of orientation of the at least one barcode; deriving, by the processor, multiple read paths for multiple read operations to be attempted within the first ROI based on the at least one angle of orientation of the at least one barcode; attempting each read operation of the multiple read operations within the first ROI along a different one of the read paths of the multiple read paths to attempt to read data encoded within a first barcode of the at least one barcode; analyzing, by the processor, the read path of each read operation of the multiple read operations to identify a first cluster of read operations of the multiple read operations that are associated with attempts to read the first barcode; analyzing, by the processor, results of each read operation within the first cluster to identify each read operation in which data encoded within the first barcode was successfully fully read; and in response to at least one read operation within the first cluster resulting in the data encoded within the first barcode being successfully fully read, providing an indication of the data encoded within the first barcode to another device via a network. The method further includes, in response to a lack of success in fully reading the data encoded within the first barcode among the read operations within the first cluster, performing operations including: for each read operation within the first cluster, analyzing, by the processor, the results to determine whether a start end of the first barcode was successfully read, and to determine whether a stop end of the first barcode was successfully read; and storing, in a storage communicatively coupled to the processor, and as part of a set of indications of read failures for a set of barcodes that includes the first barcode, an indication of at least whether both the start end and the stop end of the first barcode were successfully read in any read operation within the first cluster.

Figure 1B:
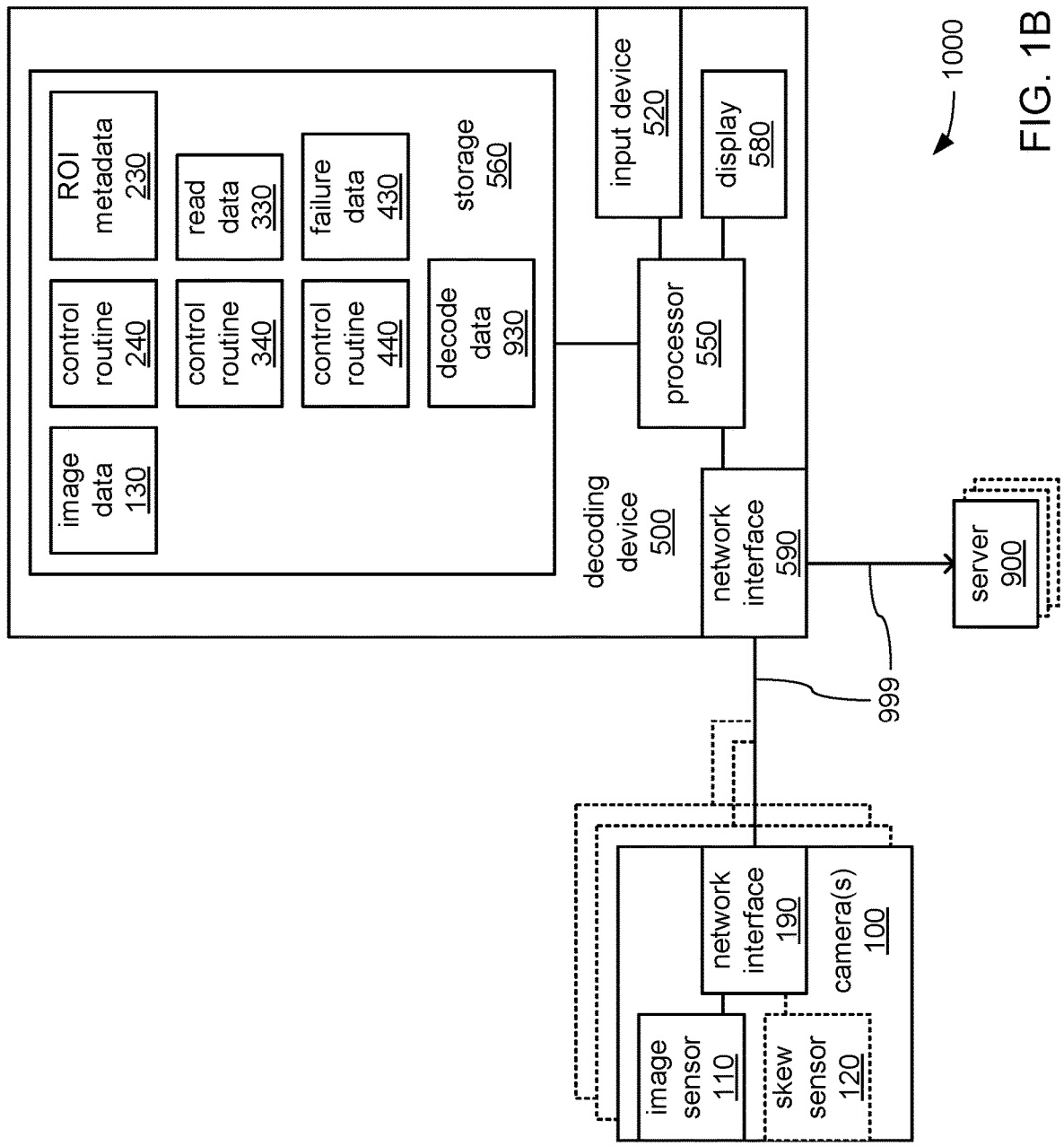

FIGS. 1A and 1B depict aspects of two different example embodiments of a decoding system 1000 that may include one or more cameras 100 coupled by a network 999 (e.g., cable-based and/or wireless links interconnecting devices) to a decoding device 500 and/or still another device, such as the depicted one or more servers 900. The cameras 100 and/or decoding device 500 of the decoding system 1000 may be incorporated into one or more electronic devices such as a machine vision device, a fixed retail scanner (e.g., bi-optic scanners, presentation scanners, single plane scanners, etc.), mobile computers, handheld scanners, fixed mounted scanners, scan engines, etc. that is configured to capture images of objects and perform decoding of encoded data markings as described herein.

In the decoding systems 1000 depicted in each of FIGS. 1A and 1B, and as will be explained in greater detail, each of the one or more cameras 100 and the decoding device 500 may cooperate through the network 999 to capture and decode images of encoded data markings carried on surface(s) of objects, such as one-dimensional indicia (e.g., barcodes), two-dimensional indicia (e.g., QR codes), digital watermarks and/or human-readable text. Following such decoding, the decoding device 500 may further transmit the decoded data to another device, such as the depicted example server 900, through the network 999.

However, and as will also be explained in greater detail, not all of such encoded data markings may be able to be successfully decoded. More specifically, the encoded data markings carried on surface(s) of at least some objects may include encoded data markings that are not able to be decoded as a result of being damaged, obscured, and/or rendered incapable of being successfully read. In such situations, and as will also be explained in greater detail, each of the one or more cameras 100 and the decoding device 500 may also cooperate through the network 999 to attempt the reading of such barcodes, and to identify the type of reading failure that is occurring for ones of the barcodes for which reading failure(s) occur.

Turning more specifically to FIG. 1A, each of the one or more cameras 100 may include an image sensor 110, a skew sensor 120, a processor 150, a storage 160, and/or a network interface 190 to provide coupling to the network 999. The processor 150 may incorporate one or more core components, one or more graphics processing unit (GPU) components, and/or one or more single-instruction multiple-data (SIMD) components to provide any of a variety of processing architectures for performing any of a variety of operations. The storage 160 may store one or more of image data 130, ROI metadata 230, and a control routine 240. Within each of the one or more cameras 100, the image sensor 110, the skew sensor 120, the storage 160 and/or the network interface 190 may each be communicatively coupled to the processor 150 to exchange data therewith through the exchange of electrical, optical, magnetic and/or other signals through one or more buses and/or other form of interconnect.

The decoding device 500 may include an input device 520, a processor 550, a storage 560, a display 580, and/or a network interface 590 to provide coupling to the network 999. The processor 550 may incorporate one or more core components, one or more graphics processing unit (GPU) components, and/or one or more single-instruction multiple-data (SIMD) components to provide any of a variety of processing architectures for performing any of a variety of operations. The storage 560 may store one or more of the image data 130 and/or ROI metadata 230 received from the one or more cameras 100, read data 330, a control routine 340, clustering metadata 430, a control routine 440, read failure data 530, and decode data 930. Within the decoding device 500, the storage 560 and/or the network interface 590 may each be communicatively coupled to the processor 550 to exchange data therewith through the exchange of electrical, optical, magnetic and/or other signals through one or more buses and/or other form of interconnect.

Each of the control routines 240, 340 and 440 may incorporate a sequence of instructions operative on corresponding ones of the processors 150 and 550 to implement logic to perform various functions. As will be explained in greater detail, in different embodiments, such as the differing embodiments depicted in FIGS. 1A and 1B, different ones of the processors 150 and 550 may be employed in executing different portions of, and/or different ones of, the control routines 240, 340 and 440 to perform different ones of those various functions.

Within each of the one or more cameras 100, the processor 150 may operate the image sensor 110 to recurringly capture images of whatever object may be within the FOV thereof, and may at least temporarily store representations of those captured images within the storage 160 as the image data 130 that is associated with that camera. In some embodiments, the processor 150 may incorporate, or be otherwise accompanied by, a direct memory access (DMA) component (not specifically shown) that may be more capable of more efficiently transferring the data representing images captured by the image sensor 110 from the image sensor 110 and into the storage 160 as the image data 130.

In executing the control routine 240, the processor 150 may then be caused by the control routine 240 to analyze each of the captured images within the image data 130 to identify one or more regions of interest (ROIs) within which one or more barcodes may be present. Transmissions of image data 130 to the decoding device 500 via the network interface 190 and the network 999 may be accompanied by transmissions of corresponding ROI metadata 230.

Within each camera 100 in some embodiments, and as will be explained in greater detail, the processor 150 may be caused to divide the FOV of the camera into a two-dimensional array of tiles (e.g., tiles of 16 pixels by 16 pixels in size). The processor 150 may then apply a transform to the values for the color and/or intensity of each pixel to identify tiles having sets of parallel alternating light and dark lines that are characteristic of a portion of a barcode. Such a transform may also derive an indication of the angle of orientation of such parallel lines in each tile in which they are identified as present. In such embodiments, identifiers of tiles in which such lines are determined to be present may be stored within the ROI metadata 230, along with indications of the angle of orientation of such lines for each such tile.

Alternatively, within each camera 100 in alternate embodiments, and as will also be explained in greater detail, the processor 150 may be caused to search the FOV of the camera 100 for instances of a two-dimensional graphical element that serves as an anchor marking. As will be familiar to those skilled in the art, an encoded data marking of a visually complex nature may be accompanied by an anchor marking that may be deliberately visually simpler so as to be more easily found by an automated system. Such an anchor marking may be subject to a requirement to always be positioned at a pre-defined distance and/or in a pre-defined orientation relative to an encoded data marking on a surface of an object so as to be able to serve as a visual guide to the location and orientation of that encoded data marking. In such alternate embodiments, indications of locations of expected locations and orientations of barcodes may be stored within the ROI metadata 230 based on the location and orientation of any anchor markings that may be found.

In embodiments of the decoding system 1000 in which each of the one or more cameras 100 additionally incorporate the skew sensor 120, the processor 150 within each camera 100 may be additionally caused to operate the skew sensor 120 to detect a degree of skew between the plane of a surface of an object that may be carrying encoded data marking(s) within an ROI and the plane of the images captured by the image sensor 110. The processor 150 may then be caused to store an indication of such a degree of skew for the surface associated with each ROI within the ROI metadata 230.

Within the decoding device 500, in executing the control routine 340, the processor 550 may be caused to operate the network interface 590 to receive the image data 130 and/or the ROI metadata 230 from each of the one or more cameras 100, and may store such data/metadata within the storage 560. Such operations may be performed at a regular interval of time or may be recurringly triggered to occur upon receipt of an indication that more of such data/metadata is available from the one or more cameras 100.

Upon receiving the image data 130 for an image captured by a camera 100, along with corresponding ROI metadata 230, the processor 550 may be caused to employ an indication in the ROI metadata 230 of an ROI and of angle of orientation of what may be a barcode within that ROI in making one or more attempts at reading that possible barcode within that ROI. As will be explained in greater detail, the reading of a barcode may be an operation that is performed along a linear path, and in a specific direction along that linear path. As will be familiar to those skilled in the art, many varieties of barcodes begin with a distinct start symbol that is encoded within the first few lines at the start end of the barcode, and end with a distinct stop symbol that is encoded within the last few lines at the stop end of the barcode. Thus, the reading of a barcode may be an operation that is performed along the linear path that is defined by angle of orientation of the barcode, and in either direction along that path (i.e., from the lines encoding the start symbol at the start end, and to the lines encoding the stop symbol at the stop end, or vice versa).

If an attempt to read that possible barcode is successful, then the processor 550 may be caused to forego making further attempts at reading that possible barcode based on a presumption that such further attempts are unnecessary. Alternatively, the occurrence of a successful attempt may have no bearing on whether such further attempts are made based on a presumption that there could be another barcode within the same ROI that may be parallel to the one that was successfully read. Regardless of whether there are one or more additional barcodes with the same angle of orientation that are also successfully read from an ROI, the processor 550 may be caused to store indication(s) of such successful reading attempt(s) within the read data 330.

However, where all attempts to read a possible barcode with an indicated angle of orientation within an ROI are unsuccessful, the processor 550 may be caused to store indication(s) of such unsuccessful reading attempt(s) within the read data 330. As will be explained in greater detail, at least a subset of unsuccessful attempts at reading barcodes may still result in successful readings of parts of barcodes. More specifically, while an attempt to read an entire barcode may be unsuccessful, such an attempt may still result in the successful reading of: 1) a portion of the barcode that includes its start end; 2) a portion of the barcode that includes its stop end; or 3) two portions of the barcode where one portion includes its start end and the other portion includes its stop end, while still another portion therebetween is not successfully read. However, it should be noted that in each of these types of unsuccessful read, it may be that one or both of the start end or the stop end is successfully identified, but no part of the data encoded in the barcode (beyond the start symbol and/or the stop symbol) could be read. Each indication of an unsuccessful attempted read of a barcode that is stored in the read data 330 may include an indication of which one of these types of failure was the result, and/or whether any portion was successfully read. In some embodiments, each indication of an attempted reading of a barcode, whether successful, partially successful or entirely unsuccessful, may be accompanied by indications of the associated ROI, angle of orientation and/or direction of reading along that angle orientation.

In embodiments of the decoding system 1000 in which each of the one or more cameras 100 additionally incorporate the skew sensor 120, the processor 550 may use indications within the ROI metadata 230 of degree of skew for each ROI to perform rectification of the image of each ROI in an effort to improve the likelihood of success of the attempted reads of possible barcodes. Alternatively, in embodiments in which the one or more cameras 100 do not incorporate such a sensor, the processor 550 may be caused to employ any of a variety of algorithms to rectify entire images of objects captured by each of the one or more cameras 100 based on various visual cues that may be present within each such image.

Following the completion of the making of attempts to read barcodes within an image, the processor 550 may be caused by execution of the control routine 440 to identify and use associations among the reading attempts made within that image (both successful and unsuccessful) to define clusters of reading attempts where each cluster is associated with a single barcode. In essence, the processor 550 is caused to perform a form of deduplication of the information about read attempts that is stored within the read data 330. In performing such clustering, information concerning what ROI and what angle of orientation is associated with each reading attempt may be used. Alternatively or additionally, where possible, the decoded data from fully successful and/or partially successful attempts to read barcodes may be used.

By way of example and as will be explained in greater detail, where multiple attempts are made to read the same barcode, and all of those attempts were successful, a combination of indications of the ROI, angle of orientation and/or decoded data from those multiple attempts may be used to identify all of those successful attempts as corresponding to the same barcode. As a result, the multiple indications within the read data 330 for those multiple successful attempts may be reduced to a single indication of successfully reading that barcode.

By way of another example and as will also be explained in greater detail, where multiple attempts are made to read the same barcode, and none were successful, different combinations of such indications may be used in identifying each of those unsuccessful attempts as corresponding to the same barcode. More specifically, where little or no encoded data beyond a start symbol or a stop symbol is able to be decoded, it may be that indications of corresponding ROI and angle of orientation must be relied upon. However, where a portion of the encoded data adjacent a start symbol and/or adjacent a stop symbol is able to be decoded, then such portions of encoded data may also be used.

In embodiments of the decoding system 1000 that include multiple cameras 100, such clustering may include identifying duplicative images of the same barcode across two or more images captured by different ones of the cameras 100. As a result of such duplicative images of a barcode, it may be that multiple attempts are made to read the same barcode, but in different ones of the multiple images. As will be explained in greater detail, the identification of duplicate images of the same barcode may take advantage of indications of degree of skew provided by the skew sensor 120 within each of the multiple cameras 100 in embodiments in which each of the cameras 100 incorporates a skew sensor 120.

Regardless of whether such clustering is performed across multiple images captured by multiple cameras 100 of an object, or entirely within a single image captured by a single camera 100 of an object, following such clustering, the processor 550 may be caused to generate the read failure data 530 to include clustered indications of unsuccessful attempts to read barcodes that specify types of failures, and may be caused to generate the decode data 930 to include the data decoded from barcodes that were each successfully decoded at least once. The processor 550 may be further caused to operate the input device 520 and the display 580 to provide a user interface by which the indications of unsuccessful attempts stored within the read failure data 530 may be presented to an operator of the decoding system 1000. Alternatively or additionally, the processor 550 may be further caused to operate the network interface 590 to transmit the decode data 930 to the server(s) 900.

Turning more specifically to FIG. 1B, the embodiment of the decoding system 1000 of FIG. 1B may be substantially similar to the decoding system 1000 of FIG. 1A. However, a substantial difference therebetween may be that, in the embodiment of the decoding system 1000 of FIG. 1B, the processor 550 of the decoding device 500 may execute of the control routine 240, instead of the processor 150 of each of the one or more cameras 100 doing so. Thus, it may be the processor 550 within the decoding device 500 that does the work of identifying the ROIs within each image captured by each of the cameras 100, and stores indications thereof and corresponding angles of orientation within the ROI metadata 230, in lieu of the processor(s) 150 of the one or more cameras 100 doing so.

It should be noted that, despite the depiction in FIGS. 1A and 1B of two different specific embodiments of the decoding system 1000 in which various functions are depicted and discussed as being split between the one or more cameras 100 and the decoding device 500, other embodiments are possible in which each camera 100 of the one or more cameras 100 may incorporate the functionality of both the camera 100 and the decoding device 500. Thus, in such other embodiments, each camera 100 of the one or more cameras 100 may, independently of each other, perform the attempts at reading barcodes, as well as the identifying of the various types of read failure that occur among the unsuccessful attempts.

Referring now to both FIGS. 1A and 1B, the image sensor 110 within each of the one or more cameras 100 may be based on any of a variety of technologies and may employ any of a variety of optical scanning and/or other image capturing techniques to capture image(s) of encoded data markings (e.g., indicia, digital watermarks and/or text) carried by a portion of an object. More specifically, the image sensor 110 may include any of a variety of light sensing components to effect the capture of an image that may include encoded data markings, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings.

In some embodiments, the image sensor 110 may additionally incorporate, or be otherwise accompanied by, any of a variety of optical components (e.g., lenses, mirrors, color-adjusting gels, etc.—not specifically shown) that may manipulate the light arriving at the image sensor 110 from within the FOV of the image sensor 110 in any of a variety of ways before it reaches the light sensing components of the image sensor 110. Alternatively or additionally, the image sensor 110 may additionally incorporate, or be otherwise accompanied by, any of a variety of illumination components (e.g., broad spectrum light sources, single frequency light sources, collimated light sources, etc.—not specifically shown) that may serve to illuminate a surface of an object within the FOV in a manner that enhances the ability of the image sensor 110 to capture an image of a portion of that surface of that object.

The objects on which the encoded data markings are carried may each be any of a variety of objects, including and not limited to, a package carrying a shipping label that includes encoded data marking(s), or a product for sale within retail packaging on which encoded data marking(s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale. Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dot-code; PDF417; QR code; ShotCode; and SPARQCode.

Each of the storages 160 and 560 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

Each of the processors 150 and 550 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processors 150 and 550 may be implemented as a single semiconductor die within a single package. Alternatively, each processor 350 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the one or more core components, the one or more GPU components, and/or the one or more SIMD components of each of the processor 150 and 550 may employ different processing architectures supporting different instruction sets to perform different operations. By way of example, each of the one or more core components may support a larger and more complex instruction set than the one or more GPU components and the one or more SIMD component, and therefore, may support a wider range of operations with a relatively limited number of operands, which may include a wider range of branching instructions. In contrast, the one or more GPU components and/or the one or more SIMD components may support a smaller and less complex instruction set than the one or more core components, but may support the performance of that narrower range of operations across numerous operands at least partially in parallel. For the one or more GPU components, this may be realized through the at least partially parallel performance of the same operations on many separate pieces of data across numerous GPU cores. For the one or more SIMD components, this may be realized with sets of multiple operands supported in side-by-side lanes of a set of SIMD registers. However, the one or more GPU components, and the one or more the SIMD components may not support branching instructions. As a result, in executing instructions, the operation and use of the one or more GPU components and/or of the one or more SIMD component may be controlled by the one or more core components.

As previously discussed, different ones of the control routines 240, 340 and 440 may be executed by different ones of the processor(s) 150 of the one or more cameras 100 and the processor 550 of the decoding device 500. As will be discussed, each of the control routines 240, 340 and 440 may incorporate one or more distinct components that each include executable instructions that cause a processor to perform one or more distinct functions when executed.

Each of the network interfaces 190 and 590 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, each of the network interfaces 190 and 590 may be configured to engage in communications that adhere to timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

FIG. 2 depicts aspects of an example implementation of the decoding system 1000 of either of FIG. 1A or 1B in capturing images, identifying ROIs, attempting reads of barcodes within those ROIs, and identifying types of failures among unsuccessful ones of those attempted reads. The depicted example implementation of the decoding system 1000 may be used to identify and decode encoded data markings 770 (e.g., barcodes) that may be applied to a label or portion 707 of a surface 701 of an object 700 in the form of a package moved along the path (e.g., via the depicted conveyor belt). More specifically, FIG. 2 provides a combination of perspective view and block diagram of an example implementation of the decoding system 1000 that includes at least four cameras 100a, 100b, 100c and 100x positioned in a manner that surrounds a location along the path of movement of the object 700. It should be noted that this depiction of this example use of this example implementation of the decoding system 1000 is but one possible example provided herein for purposes of illustration, and should not be taken as limiting. Stated differently, other uses of other implementations of the decoding system 1000 are possible in which the object 700 may be any of a variety of objects other than a package moved along a conveyor belt, in which a different quantity of the cameras 100a-x may be used, and/or in which each of the cameras 100a-x may be mounted as a set to a vehicle such that it is the cameras 100a-x of the decoding system 1000 that are moved relative to the object 700, instead of the object 700 being moved relative to the cameras 100a-x.

As depicted, the at least four cameras 100a-x are positioned to cause at least a portion of a location along the path of movement of the object 700 to be placed within each of the FOVs 118a-x of the image sensor 110 within each of the cameras 100a-x, respectively. As also depicted, two or more of the FOVs 118a-x may overlap. However, it should be noted that other embodiments are possible in which none of the FOVs 118a-x overlap. Indeed, other embodiments are possible in which two or more of the cameras 100a-x may be positioned to place entirely different locations along the path of movement of the object 700 within their respective ones of the FOVs 118a-x. Stated differently, the at least four cameras 100a-x may be positioned to cover a single location along its path such that each is able to capture an image of a different portion of the object 700 simultaneously as the object 700 moves along its path, or the at least four cameras 100a-x may be positioned to cover different locations along the path of the object 700 such that each is able to capture an image of a different portion of the object 700 as the object 700 moves through their separate ones of the FOVs 118a-x at different times.

Regardless of the manner in which the at least four cameras 100a-x are positioned relative to one or more locations along the path of movement of the object, each of the at least four cameras 100a-x may be communicatively coupled to the decoding device 500 through the network 999, and may cooperate with the decoding device 500 through the network 999 to identify ROI(s) within each of multiple captured images, and to perform one or more tasks that may include decoding one or more encoded data markings 770 (e.g., barcodes) within such ROIs, as discussed above. Further, following such decoding, the resulting decoded data may be transmitted by the decoding device 500 to another device via the network 999, such as the depicted server 900.

FIGS. 3A, 3B, 3C and 3D, together, depict aspects of examples of differing approaches to the identification of regions of interest (ROIs) 880 in which one or more barcodes 770 may be found. More specifically, FIGS. 3A-D depict aspects of processing operations caused to be performed by the processor(s) 150 or 550 as a result of executing the control routine 240 to identify such ROIs 880.

As depicted across all of FIGS. 3A-D, the image data 130 may include one or more images 800 captured by the image sensor 110 of one of the camera(s) 100 of a portion of a surface 701 an object 700 that carries a barcode 770, and that is at least momentarily within the FOV 118 of that sensor 110. The image 800 may be made up of a two-dimensional array of pixels 801, and the image data 130 may store data values representing color and/or intensity of light detected by the image sensor 110 for each of the pixels 801. As will be familiar to those skilled in the art, such data values may encode the color and/or intensity of the pixels 801 in using any of a variety of widely used and accepted encoding schemes, including and not limited to, RGB, YUV, etc., with any of a variety of quantities of bits allocated to each component (e.g., color component, luminance component, chrominance component, etc.).

Figure 3A:
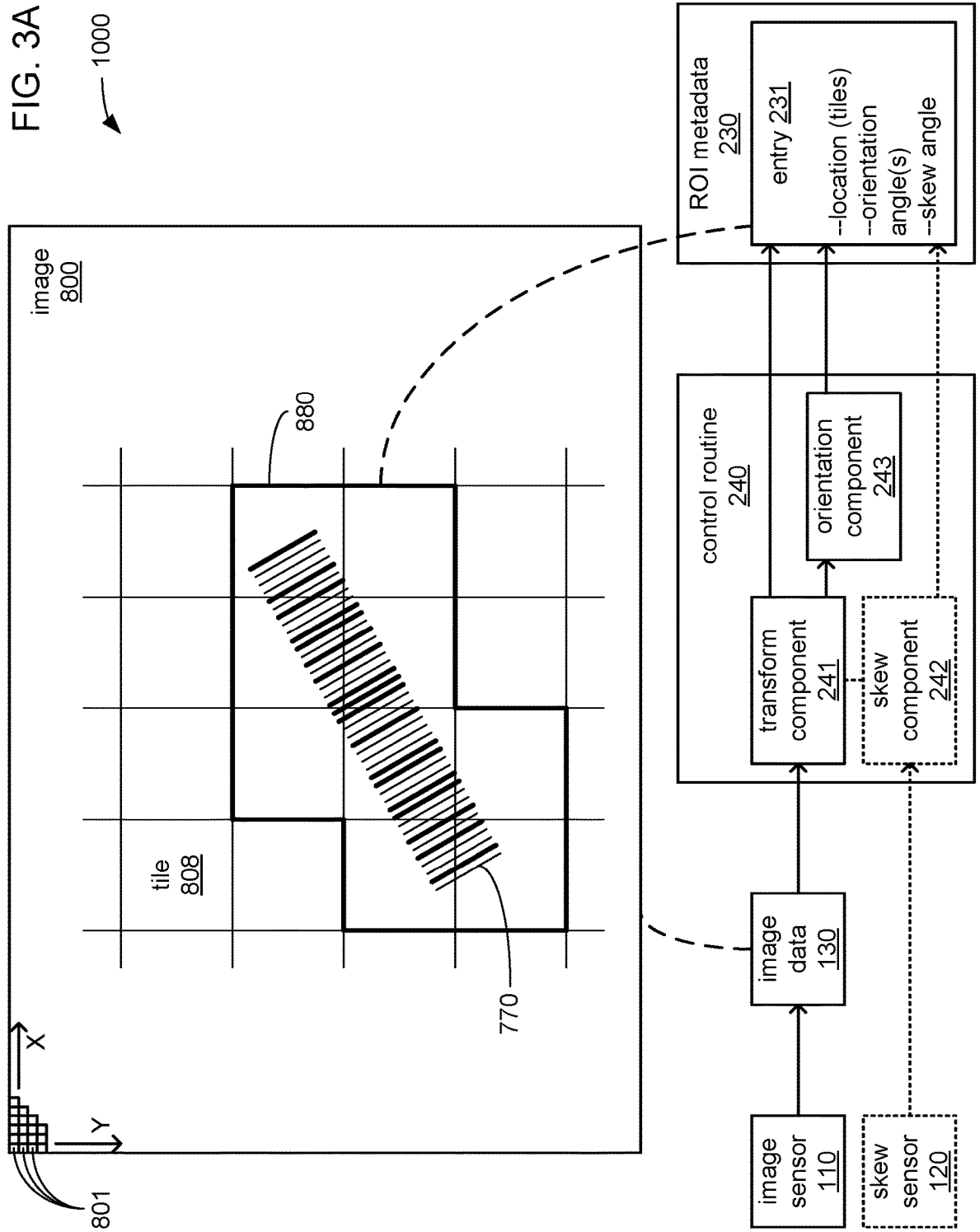
FIGS. 3A, 3B, 3C and 3D, together, show aspects of identification of ROIs by the decoding system of either FIG. 1A or 1B.
Figure 3B:
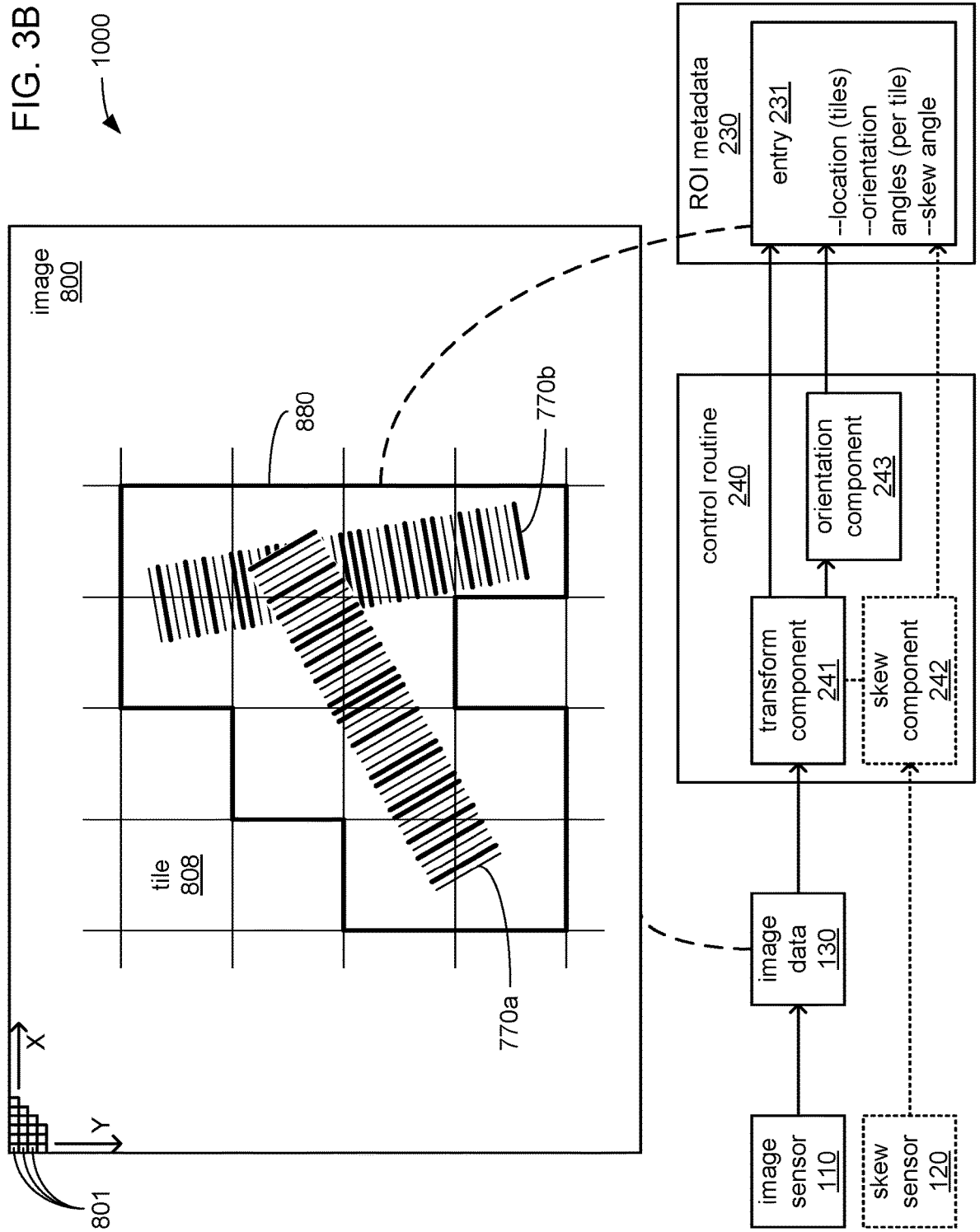

Turning to FIGS. 3A-B, as depicted, the control routine 240 may incorporate a transform component 241 that may cause processor(s) 150 or 550 to implement one approach to identifying ROIs 880 in which the 2D array of pixels 801 is divided into tiles 808 (e.g., square tiles of 16 pixels by 16 pixels), and each tile 808 is subjected to a transform. An example of such an approach is set forth in U.S. Pat. No. 10,346,660 issued Jul. 9, 2019, which is incorporated herein by reference for all purposes. Such a transform may be selected to be sensitive to the presence, within each tile 880, of multiple parallel lines of alternating light and dark intensities, which would be consistent with an image of at least a portion of a barcode, such as the depicted barcode 770. For each tile 880, such a transform may output a numerical value indicative of a likelihood of the presence of such parallel lines. Each group of contiguously adjacent tiles 880 having a degree of likelihood for such parallel lines that at least meets a pre-defined threshold may be deemed to be an ROI 880 in which it is deemed likely that at least one barcode 770 is present.

For each ROI 880 identified as present within the image 800, an entry 231 may be generated within the ROI metadata 230, and the entry 231 may be generated to include at least an indication of the location of the ROI 880 within the image 800. In some embodiments, such an indication of location may include identifiers and/or coordinates of the tiles 808 that are included in the ROI 880. In other embodiments, such an indication of location may include a description of the edges and/or corners (e.g., lengths and/or coordinates) of the boundary defining the ROI 880.

As also depicted, the control routine 240 may also incorporate an orientation component 243. The orientation component 243 may cause processor(s) 150 or 550 to additionally employ the same transform (or an additional transform) to determine an angle of orientation of such parallel lines within each of the tiles 808 within the ROI 880. Indication(s) of the angle of orientation for at least one of the tiles 808 within the ROI 880 may be included in the entry 231 for the ROI 880 that is generated within the ROI metadata 230.

In embodiments of the decoding system 1000 in which each of the cameras 100 include a skew sensor 120, the control routine 240 may additionally incorporate a skew component 242, as additionally depicted. The skew component 242 may cause the processor(s) 150 or 550 to use the indication of skew angle received from such a skew sensor 120 for the image 800 to perform rectification of the entirety of the image 800 or of each tile 808 to improve the effectiveness of the transform in identifying ROIs 880. Alternatively or additionally, the skew component 242 may cause processor(s) 150 or 550 to additionally include an indication of the skew angle in the entry 231 generated for the ROI 880.

It should be noted, in comparing FIGS. 3A and 3B, in using this approach to identifying ROIs 880, there is at least some degree of likelihood that each ROI 880 may include either just a single barcode 770 (as depicted in FIG. 3A) or multiple barcodes 770 (as depicted in FIG. 3B).

Figure 3C:
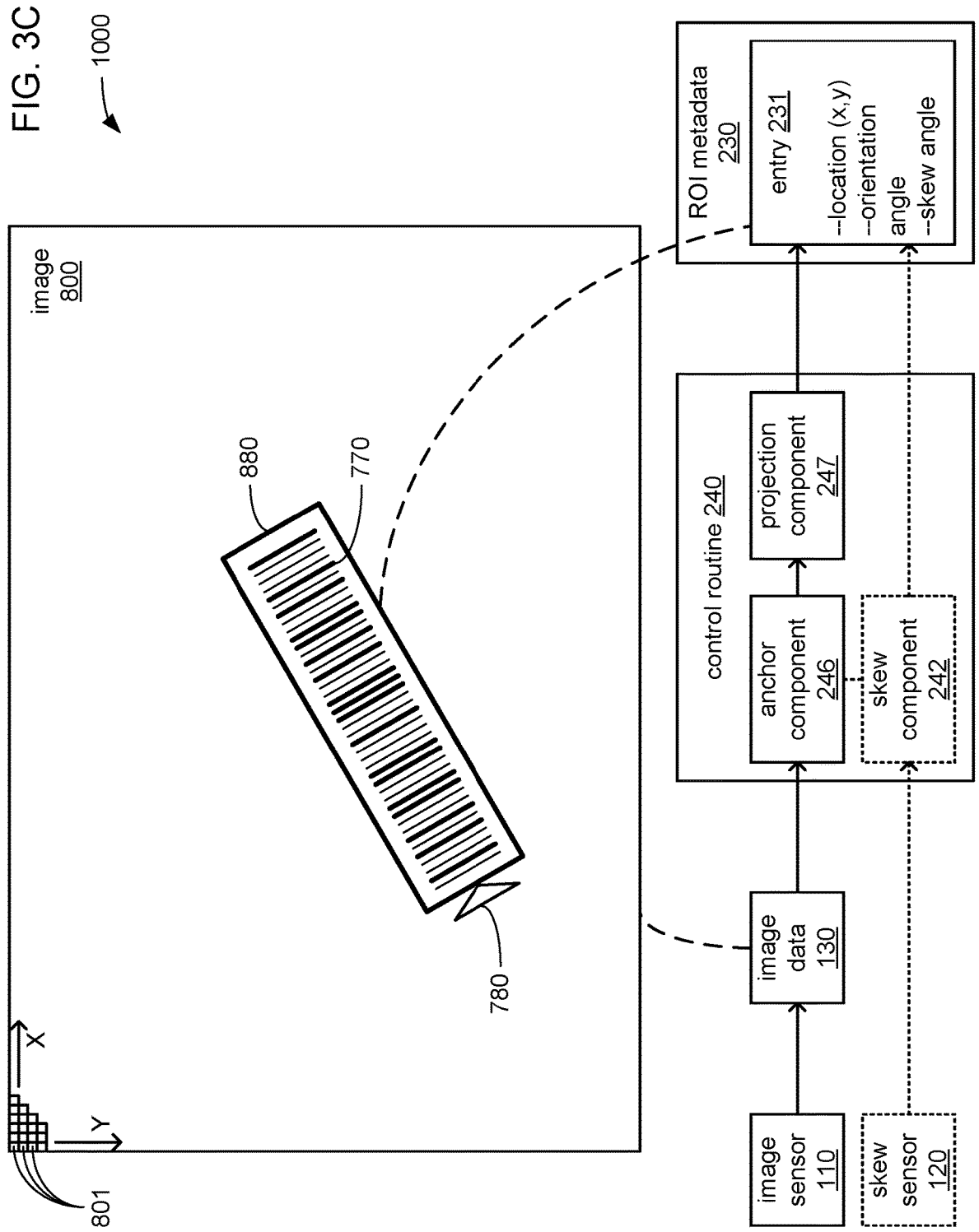
Figure 3D:
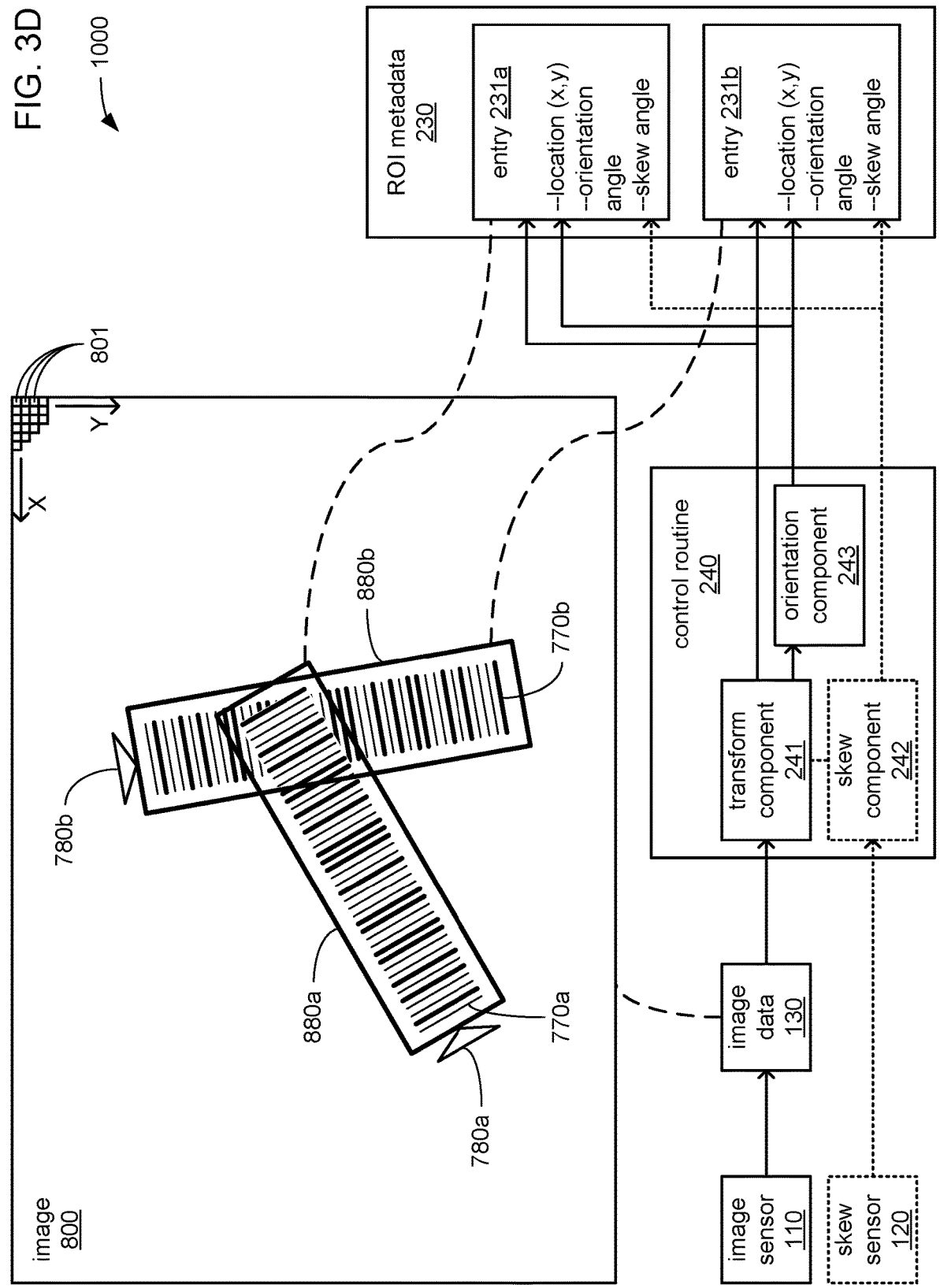

Turning to FIGS. 3C-D, as depicted, the control routine 240 may incorporate an anchor component 246 (instead of the transform component 241) that may cause processor(s) 150 or 550 to implement a different approach to identifying ROIs 880 in which the image 800 is searched for instances of an anchor marker 780, such as the depicted exemplary triangle-shaped anchor marker 780. The anchor marker 780 may be created to be smaller and have a significantly less complex appearance than any barcode 770 so as to also be sufficiently distinctive as to be significantly easier to locate within the image 880 than any barcode 770, and through use of relatively simple techniques that require relatively little in the way of processing resources. An example of such an approach is set forth in U.S. Pat. No. 11,003,881 issued May 11, 2021, which is incorporated herein by reference for all purposes. Each instance of such a marker may have pre-defined relative size and location relationships with the barcode 770 that is to accompany it.

Thus, in support of using each located instance of the anchor marker 780 to locate a corresponding barcode 770, the control routine 240 may incorporate a projection component 247 to cause processor(s) 150 or 550 to analyze the size, position and orientation of each instance of the anchor marker 780 within the image 800 to predict the size, position and orientation of its corresponding barcode 770 within the image 800. Such a prediction of the size, position and orientation of the corresponding barcode 770 may be used to define the ROI 880 at which that barcode 770 is expected to be present.

For each ROI 880 identified as present within the image 800 using this approach, an entry 231 may be generated within the ROI metadata 230. The entry 231 may be generated to include at least indications of the location and/or orientation of the ROI 880 within the image 800. In some embodiments, such an indication of location may include a description of the edges and/or corners (e.g., pixel lengths and/or pixel coordinates) of the boundary defining the ROI 880.

Again, in embodiments of the decoding system 1000 in which each of the cameras 100 include a skew sensor 120, the control routine 240 may additionally incorporate a skew component 242, as additionally depicted. The skew component 242 may cause the processor(s) 150 or 550 to use the indication of skew angle received from such a skew sensor 120 for the image 800 to perform rectification of the image 800 to improve the effectiveness of the use of the anchor markers 780 in identifying ROIs 880. Alternatively or additionally, the skew component 242 may cause processor(s) 150 or 550 to additionally include an indication of the skew angle in the entry 231 generated for the ROI 880.

It should be noted, in comparing FIGS. 3C and 3D, in using this approach to identifying ROIs 880, even where two barcodes 770 overlap in the image 880, the use of the separate anchor marker 780 for each barcode 770 serves to ensure that there will be just one barcode 770 within each ROI 880. However, as depicted in FIG. 3D, there may be instances of two or more ROIs 880 overlapping.

FIGS. 4A, 4B, 4C, 4D, 4E, 4F, 4G and 4H, together, depict aspects of examples of attempting to read barcodes 770 within ROI 880. More specifically, FIGS. 4A-H depict aspects of processing operations caused to be performed by the processor(s) 550 of the decoding device 500 as a result of executing the control routine 340 to attempt to read each barcode 770.

As depicted across all of FIGS. 4A-H, each entry 231 within the ROI metadata 230 includes information concerning an ROI 880 that is used as the basis for making multiple attempts at reading at least one barcode 770 that may be present therein. For each such attempt that is made at reading a barcode 770, an entry 331 may be generated within the read data 330 that is indicative of characteristics of the attempt and of its result.

Figure 4A:
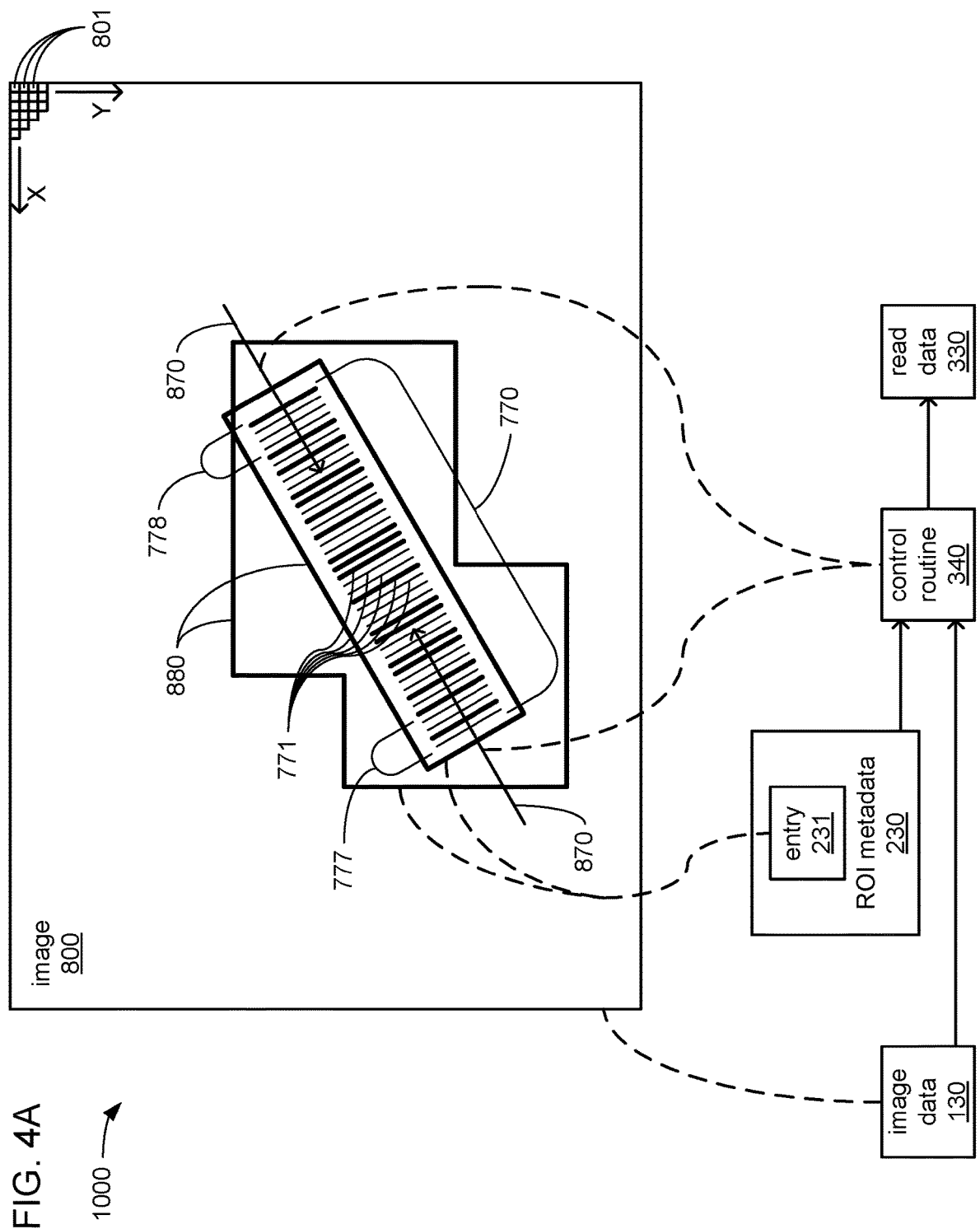

Turning to FIG. 4A, as depicted, a barcode 770 may be made up of a set of lines 771 arranged in parallel to give the barcode 770 a generally elongate rectangular shape where the elongate dimension extends cross-wise to each of the lines 771. At one end of the elongate dimension may be a subset of the lines 771 that defines the start end 777, and that encodes a start symbol. Correspondingly, at the other end of the elongate dimension may be another subset of the lines 771 that defines the stop end 778, and that encodes the stop symbol. In various embodiments, the start end 777 and the stop end 778 may each assist in the reading of the barcode 770 by serving to make clear exactly what are the lines 771 within the barcode 770 that are used to encode data. In this way, an accidental misreading of the encoded data may be avoided in which the decoding starts at a position that is shifted by one of the lines 771, thereby potentially resulting in a reading of gibberish, rather than the encoded data. Thus, with a barcode 770 provided intact such that none of the lines 771 are obscured, the barcode 770 may be read either along a read path 870 starting at the start end 777, or along a read path 870 starting at the stop end 778.

Therefore, and as also depicted, regardless of whether the approach of FIGS. 3A-B or the approach of FIGS. 3C-D is used to identify an ROI 880, such that the boundaries of an ROI 880 may be defined by a set of contiguous adjacent tiles 880 or as a single elongate rectangle relative to an anchor marker 780, the approach to making attempts to read the barcode 770 within that ROI 880 may remain the same. Specifically, for each ROI 880 described in an entry 231 in the ROI metadata 230, the indication(s) of boundaries of the ROI 880 and of angle(s) or orientation of at least one barcode 770 expected to be present therein may be used to define starting points for the read paths 870 of reads of the barcode that are to be attempted. Each read path 870 may start at a starting point that is at, or relatively close to, a location along the boundary of the ROI 880, that is also relatively close to the start end or stop end of barcode 770. Each read path may then proceed inward into the ROI 880 from that starting point, and in a direction that causes the read path 870 to be at least relatively close to what should be the angle of orientation of the elongate dimension of the barcode 770.

Figure 4B:
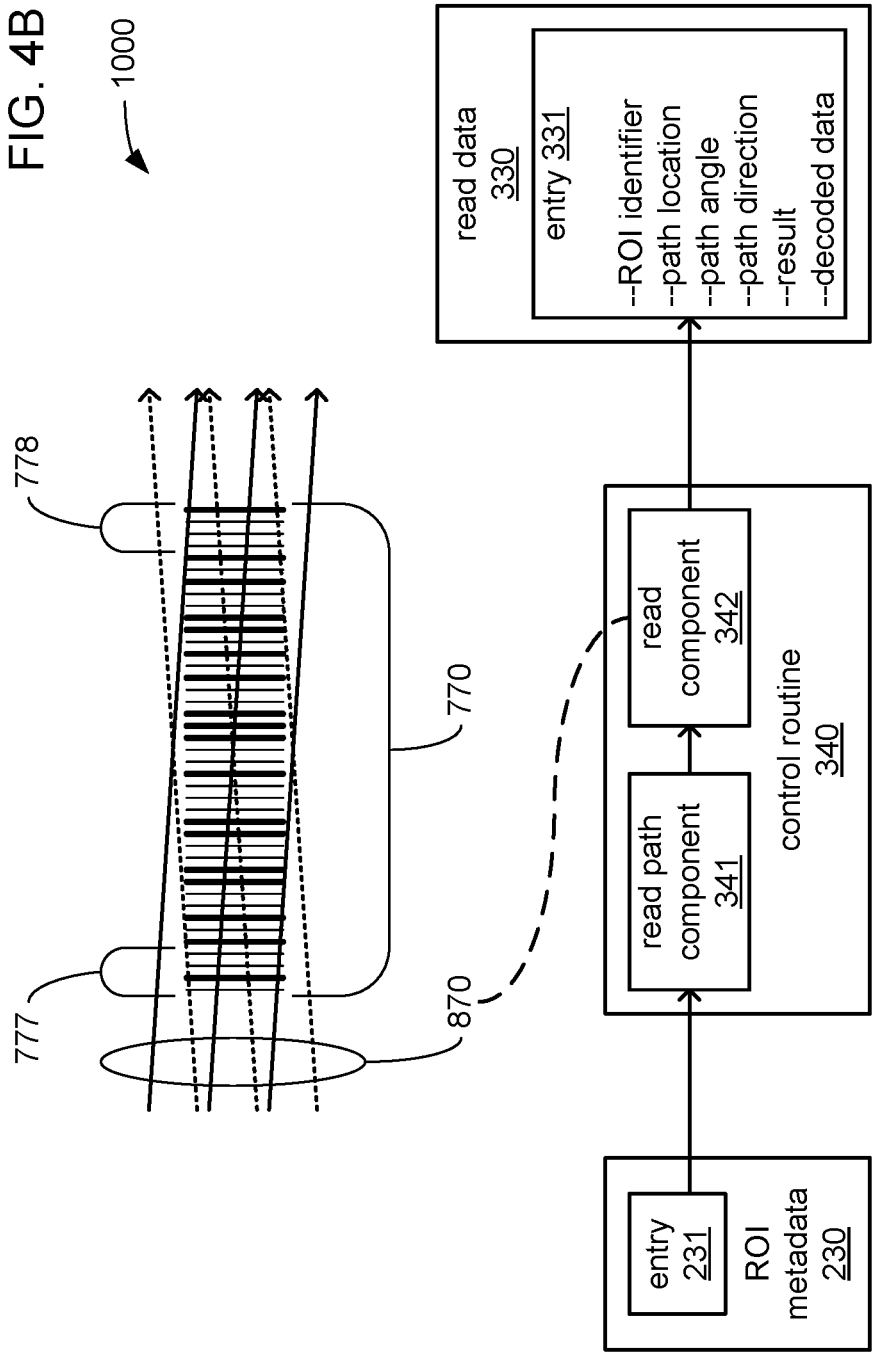

Turning to FIGS. 4B-C, as depicted, the control routine 340 may incorporate a read path component 341 that may cause processor(s) 550 to analyze the indications of location and orientation described within an entry 231 of the ROI metadata 230 for an ROI 880 to derive multiple read paths 870 for making multiple attempts at reading a barcode 770 that may be present within the ROI 880. Some of those multiple read paths 870 may begin where the start end 777 is expected to be (as depicted in FIG. 4B), and others of those multiple read paths 870 may begin where the stop end 778 is expected to be (as depicted in FIG. 4C).

In some embodiments, in an effort to increase the likelihood of success in at least one attempt to read the entirety of the barcode 770 along the elongate length of its generally rectangular shape, the processor(s) 550 may be caused by the read path component 341 to spread out the starting points near each of the start end 777 and stop end 778 cross-wise relative to the elongate dimension of the barcode 770. Alternatively or additionally, in another effort to increase the likelihood of success in at least one attempt to read the entirety of the barcode 770 along the elongate length of its generally rectangular shape, processor(s) 550 may be caused by the read path component 341 to introduce some predefined range of variation in the in angle of orientation among the read attempts that are made starting from each of the ends 777 and 778 of the barcode 770. Such a range of variation may be based on the range of degree of accuracy (or lack thereof) that is expected in determining the angle or orientation either by the use of a transform as discussed in connection with FIGS. 3A-B, or by the use of the orientation of an anchor marker 780 as discussed in connection with FIGS. 3C-D. As a result of such measures, and as depicted in each of FIGS. 4B and 4C, even where a barcode 770 is complete such that no part of it is missing, obscured or otherwise made unreadable, it may be that only a subset of the read paths 870 that are defined by the read path component 341 will actually extend along the full elongate dimension of the barcode 770 such that there will be success in reading the barcode 770 therealong.

As also depicted, the control routine 340 may incorporate a read component 342 that may cause processor(s) 550 to make each attempt at reading the barcode 770 along one of the read paths 870, regardless of the exact manner and/or the rationale with which each of the read paths 870 were defined by the read path component 341. For each attempt at reading the barcode 770 that is made along one of the read paths 870, an entry 331 may be added to the read data 330 that specifies characteristics of the read path 870 that was followed in doing so, and that specifies the results of the attempt.

Figure 4E:
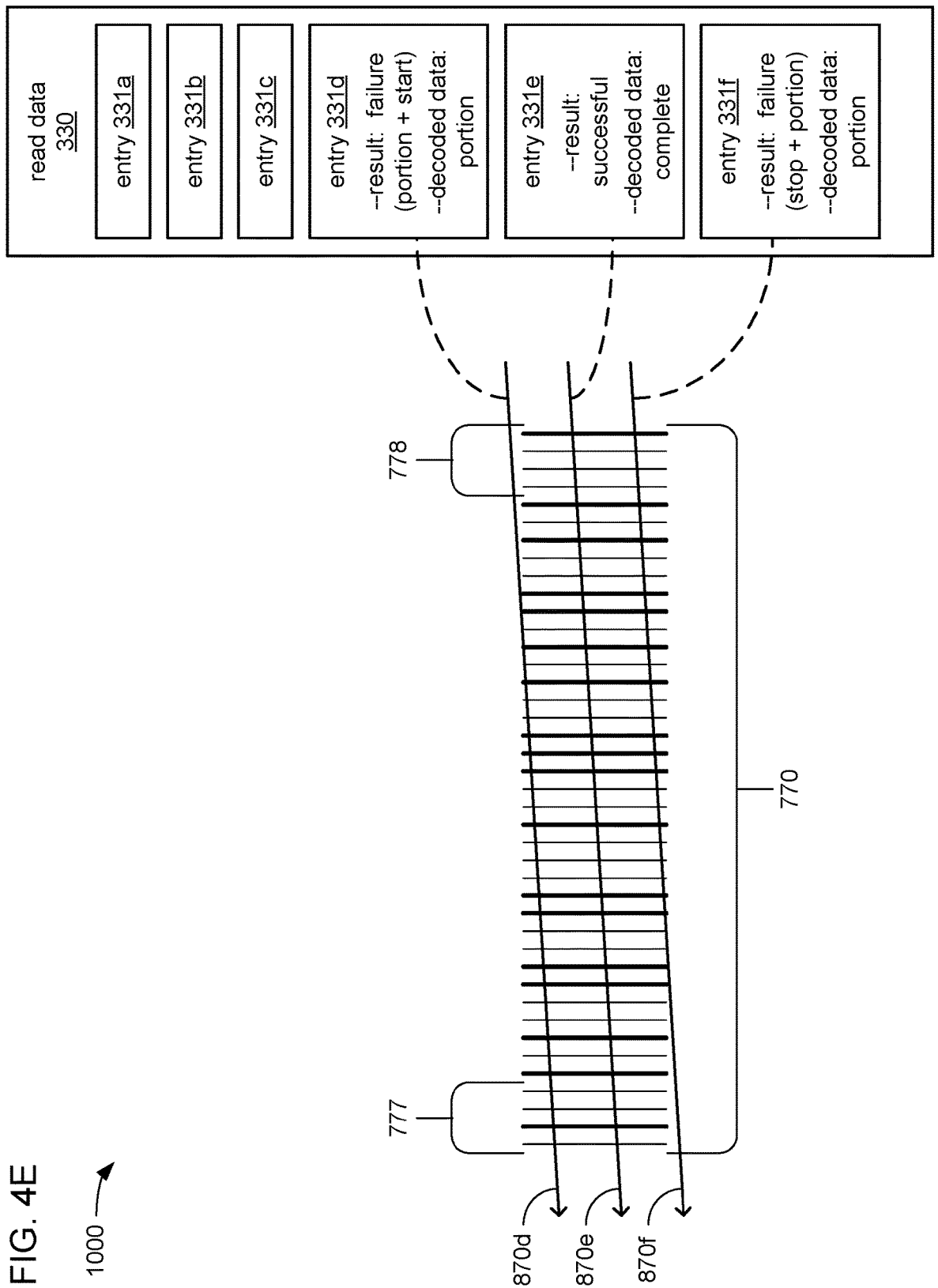

FIGS. 4D-E, together, depict aspects of a deliberately simplified example of making six attempts at reading a fully complete and unobscured barcode 770. Specifically, three attempts are made in FIG. 4D along read paths 870*a-c*, and another three attempts are made in FIG. 4E along read paths 870*d-f*. Also there is no variation in angle of orientation among the read paths 870*a-c* in FIG. 4D, and there is similarly no variation in angle of orientation among the read paths 870*d-f* in FIG. 4E. This deliberately simplified example is presented for ease of discuss and understanding, and should not be taken as limiting.

Turning to FIG. 4D, as depicted, the attempt at reading the depicted barcode 770 along the depicted read path 870*b* was one of only two of the attempts that was fully successful, as reflected in the corresponding entry 331*b* that is generated as part of the read data 330.

In contrast, the read attempt made along the read path 870*a* fails as a result of missing the start end 777, as well as a portion of the data encoded in lines 771 that are relatively close to the start end 777. As a result, and as reflected in the corresponding entry 331*a*, the stop end 778 was successfully read (e.g., the stop symbol encoded therein was successfully read), along with the encoded data in the lines 771 that are relatively close to stop end 778.

Similarly, the read attempt made along the read path 870*c* fails as a result of missing the stop end 778, as well as a portion of the data encoded in lines 771 that are relatively close to the stop end 778. As a result, and as reflected in the corresponding entry 331*c*, the start end 777 was successfully read (e.g., the start symbol encoded therein was successfully read), along with the encoded data in the lines 771 that are relatively close to start end 777.

Turning to FIG. 4E, as depicted, the attempt at reading the depicted barcode 770 along the depicted read path 870*e* was the other one of only two of the attempts that was fully successful, as reflected in the corresponding entry 331*e* that is generated as part of the read data 330.

In contrast, the read attempt made along the read path 870*d* fails as a result of missing the stop end 778, as well as a portion of the data encoded in lines 771 that are relatively close to the stop end 778. As a result, and as reflected in the corresponding entry 331*d*, the start end 777 was successfully read, along with the encoded data in the lines 771 that are relatively close to start end 777.

Similarly, the read attempt made along the read path 870*f* fails as a result of missing the start end 777, as well as a portion of the data encoded in lines 771 that are relatively close to the start end 777. As a result, and as reflected in the corresponding entry 331*f*, the stop end 778 was successfully read, along with the encoded data in the lines 771 that are relatively close to stop end 778.

Figure 4F:
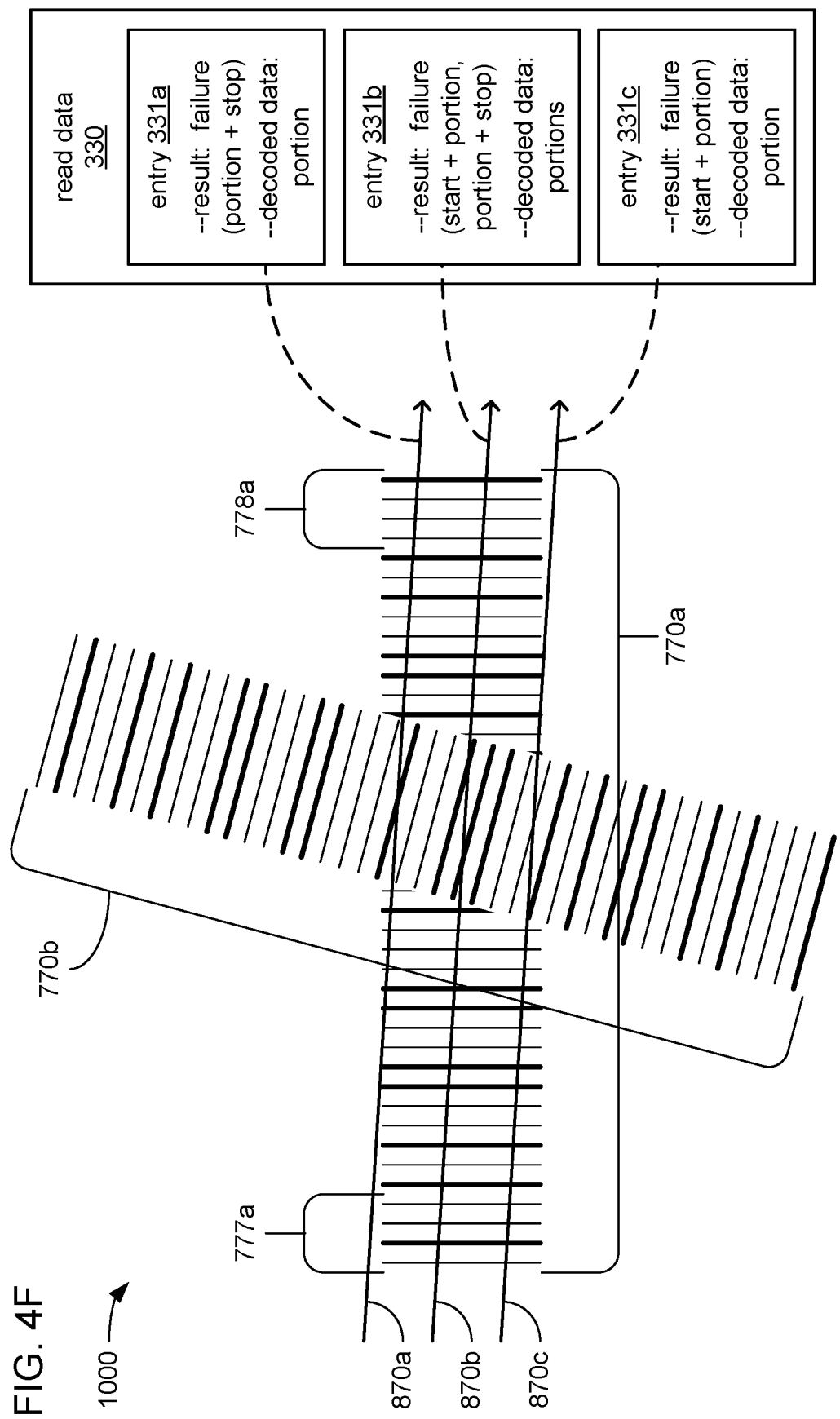

FIG. 4F depicts aspects of another deliberately simplified example of making three attempts at reading a barcode 770*a* where the barcode partially obscured or made otherwise unreadable approximately mid-way along its elongate dimension. In this particular example, the barcode 770*a* is obscured by another barcode 770*b*. However, in other situations, it may be that a portion of the barcode 770*a* may be obscured in another entirely different manner (e.g., by dirt, smudge marks, creases, etc.), or may otherwise have a defect that in some way renders at least a portion of the barcode 770a unreadable.

In this deliberately simplified example in FIG. 4F, three read attempts are made along read paths 870a-c. There may be other read attempts made in the reverse direction along other read paths 870, but these are not shown for sake of simplicity. Again there is no variation in angle of orientation among the read paths 870a-c in FIG. 4F. Again, this deliberately simplified example is presented for ease of discuss and understanding, and should not be taken as limiting.

As depicted, none of these three read attempts are successful due, at least, to the overlapping of the middle portion of the barcode 770a by the other barcode 770b. As a result, a portion of the barcode 770a may still be readable, but not the entirety of the barcode 770a. For example, the attempt at reading the depicted barcode 770 along the depicted read path 870b may include successful reads of the start end 777a and the stop end 778a, as well as portions of the data encoded in lines 771 that are relatively close to the start end 777a and the stop end 778a, as reflected in the corresponding entry 331b that is generated as part of the read data 330. However, it is simply not possible to read the data encoded in the lines 771 that are covered over by the other barcode 770b.

The read attempt made along the read path 870a additionally fails as a result of missing the start end 777a, as well as a portion of the data encoded in lines 771 that are relatively close to the start end 777a. As a result, and as reflected in the corresponding entry 331a, the stop end 778a was successfully read, along with the encoded data in the lines 771 that are relatively close to stop end 778a.

The read attempt made along the read path 870c fails as a result of missing the stop end 778a, as well as a portion of the data encoded in lines 771 that are relatively close to the stop end 778a. As a result, and as reflected in the corresponding entry 331c, the start end 777a was successfully read, along with the encoded data in the lines 771 that are relatively close to start end 777a.

FIGS. 4G-H, together, depict aspects of still another deliberately simplified example of making six attempts at reading a barcode 770a where the barcode 770a is partially obscured at the stop end 778a, thereof. Specifically, three attempts are made in FIG. 4G along read paths 870a-c, and another three attempts are made in FIG. 4H along read paths 870d-f. Again there is no variation in angle of orientation among the read paths 870a-c in FIG. 4G, and there is similarly no variation in angle of orientation among the read paths 870d-f in FIG. 4H. Again, this deliberately simplified example is presented for ease of discuss and understanding, and should not be taken as limiting.

As depicted in FIGS. 4G-H, none of these six read attempts are successful due, at least, to the overlapping of the stop end 778a by another bar code 770b, as shown in this example. However, as previously discussed, any of a variety of situations may arise that may cause some or all of a barcode to become unreadable, including and not limited to, a portion of a barcode being damaged (e.g., worn or torn away), broken (e.g., partially ripped), smudged, obscured by any of a variety of overlying items (e.g., dirt, ink from markers, packaging tape, etc.), and/or at partially hidden from view (e.g., extending into a fold formed in a surface, and/or otherwise carried on a portion of a surface that extends into a location that is out of view of any camera).

Turning to FIG. 4G, the attempt at reading the depicted barcode 770a along the depicted read path 870b may include a successful read of the start end 777a, as well as portions of the data encoded in lines 771 that are relatively close to the start end 777a, as reflected in the corresponding entry 331b that is generated as part of the read data 330. However, it is simply not possible to read the data encoded in the lines 771 that are covered over by the other barcode 770b, including at least a subset of the lines 771 that encode the stop symbol of the stop end 778a.

The read attempt made along the read path 870a is entirely unsuccessful as a result of both missing the start end 777a, and the stop end 778a being covered over by the other barcode 770b. As a result, and as reflected in the corresponding entry 331a, no part of the barcode 770a was successfully read.

The read attempt made along the read path 870c again fails, not as a result of the stop end 778a being obscured, but as a result of missing the stop end 778a, as well as a portion of the data encoded in lines 771 that are relatively close to the stop end 778a. As a result, and as reflected in the corresponding entry 331c, the start end 777a was successfully read, along with the encoded data in the lines 771 that are relatively close to start end 777a.

Turning to FIG. 4H, as depicted, the read attempt made along the read path 870d fails, not as a result of the stop end 778a being obscured by the other barcode 770b, but as a result of missing the stop end 778a, as well as a portion of the data encoded in lines 771 that are relatively close to the stop end 778a. As a result, and as reflected in the corresponding entry 331d, the start end 777a was successfully read, along with the encoded data in the lines 771 that are relatively close to start end 777a.

The read attempt at reading the depicted barcode 770 along the depicted read path 870e fails as a result of the stop end 778a being obscured. As a result, and as reflected in the corresponding entry 331e, the start end 777a was successfully read, along with the encoded data in the lines 771 that are relatively close to start end 777a.

The read attempt made along the read path 870f is entirely unsuccessful as a result of both missing the start end 777a, and the stop end 778a being covered over by the other barcode 770b. As a result, and as reflected in the corresponding entry 331f, no part of the barcode 770a was successfully read.

Similar entries in the read data 330 may be generated during the attempts at decoding the other barcode 770b, but such entries are not shown for simplicity. Of course, any number of barcodes may be present within an image which may or may not be obscured, resulting in fully successful read attempts, and/or failed read attempts where at least a portion of the encoded data may or may not have been read. The result of the decoding analysis in FIGS. 4A-H is an unorganized set of entries 331 within the read data 330 that may indicate partially detected read attempts. Such an unorganized set of entries 331 of partially detected read attempts may at that present time not be associated with any particular barcode as a result of the possibility that each ROI 880 may include more than one barcode 770.

FIGS. 5A, 5B, 5C and 5D, together, depict aspects of an example of clustering of information from the entries 331 of the read data 330 to determine, for each barcode 770 carried by a single object 700, whether the attempts to read that barcode 770 ultimately resulted in success with at least one read attempt, and to record aspects of the failures that occurred for each one of those barcodes 770 for which there was no successful read. In other words, one or more subsets of multiple entries 331 among an unorganized set of entries 331 within the read data 330 may be identified as corresponding to multiple attempts to read the same barcode 770 within an image 800 based commonalities found in the data in their respective entries 331, such as ROI 880, angle of orientation, partial decodes of encoded data, etc.

Where a subset of multiple entries 331 is identified as corresponding to multiple attempts to read the same barcode 770, such a subset may become clustered together as part of determining whether there were any attempts to read that barcode 770 that were successful. In some embodiments, where there was at least one successful read attempt among the multiple read attempts of a cluster such that the data encoded within the corresponding barcode 770 was successfully read, that cluster may not be included in any counting or analysis of failures of attempted reads, since the encoded data was ultimately successfully read.

Alternatively or additionally, in some embodiments, where there were no successful read attempts among the multiple read attempts of a cluster, any portions of the data encoded within a barcode 770 that were successfully read among those multiple read attempts of the cluster may be analyzed to determine if two or more of such portions are able to be combined to derive the entirety of that encoded data. If such a combining of two or more portions is possible, then such a cluster may not be included in any counting or analysis of failures of attempted reads, since the encoded data was ultimately able to be derived.

However, where there were no successful read attempts among the multiple read attempts of a cluster, and no combination of two or more portions that are able to be combined to derive the entirety of the encoded data, then such a cluster may be included in counting(s) and/or in an analysis of aspects of the failures of attempted reads. More precisely, the multiple read attempts of such a cluster may be analyzed to identify a reason for the failures, and/or to assign one of a pre-defined set of types of failure to each read attempt or to the whole cluster of multiple read attempts. Such categorization may be used as a starting point for further analyses concerning reason(s) for failures.

By way of example, if none of the read attempts of a cluster resulted in a successful read of the stop end 778 of a barcode 770, but at least a subset of the read attempts of that cluster resulted in successful reads of no more than the start end 777 of the barcode 770, and maybe also a portion of the data encoded within the lines 771 close to the start end 777, then it may be inferred that the barcode is damaged or otherwise obscured at the stop end 778 thereof. Such a cluster of read attempts may be categorized as a "start end" cluster. Similarly, if none of the read attempts of a cluster resulted in a successful read of the start end 777 of a barcode 770, but at least a subset of the read attempts of that cluster resulted in successful reads of no more than the stop end 778 of the barcode 770, and maybe also a portion of the data encoded within the lines 771 close to the stop end 778, then it may be inferred that the barcode is damaged or otherwise obscured at the start end 777 thereof. Such a cluster of read attempts may be categorized as a "stop end" cluster. Alternatively or additionally, either of such clusters may be categorized as a "one-end only" cluster or as a "finder pattern missing" cluster.

By way of another example, if none of the read attempts of a cluster resulted in a successful read of the entirety of the data encoded within a barcode 770, but at least a subset of the read attempts of that cluster resulted in successful reads of both the start end 777 and the stop end 778 of the barcode 770, and maybe also a portion of the data encoded within the lines 771 close to either or both of the start end 777 and the stop end 778, then it may be inferred that the barcode is damaged or otherwise obscured at a location between the start end 777 and the stop end 778 thereof. Such a cluster of read attempts may be categorized as a "dual end" or "broken" cluster to indicate a type of read failure in which, despite the successful reading of the ends 777 and 778, there was no successful read and/or derivation of the data encoded within the corresponding barcode 770. In some embodiments, individual scan lines of partial labels contributing to a cluster may be used to further extract more detailed descriptors (e.g., geometric, semantic, or image based) for a more detailed analysis.

In some embodiments, such a categorization as a "dual end" or "broken" cluster may be given to a cluster in which none of the multiple read attempts thereof resulted in the successful reading of both of the ends 777 and 778 in the same read attempt, but each of the ends 777 and 778 was successful read in at least one of those multiple read attempts. Again, and as previously discussed, for a cluster of read attempts to be given such a categorization of read failure, it may also be required that the encoded data of the barcode 770 is not able to be derived by combining two or more portions thereof that were successfully read across the multiple read attempts.

FIGS. 5A-D illustrate various aspects of clustering of read attempts associated with the same barcode 770, and various aspects of categorizing clusters of read attempts, including clusters of failed read attempts in which it may not have been possible to derive the data encoded within the corresponding barcode 770. As previously discussed, each entry 331 within the read data 330 may be generated to correspond to a single attempt to read a barcode 770. And again, each entry 331 may include indications of various aspects of the read path 870 of the corresponding read attempt, as well as an indication of success or failure, and any data that may have been successfully decoded.

Figure 5A:
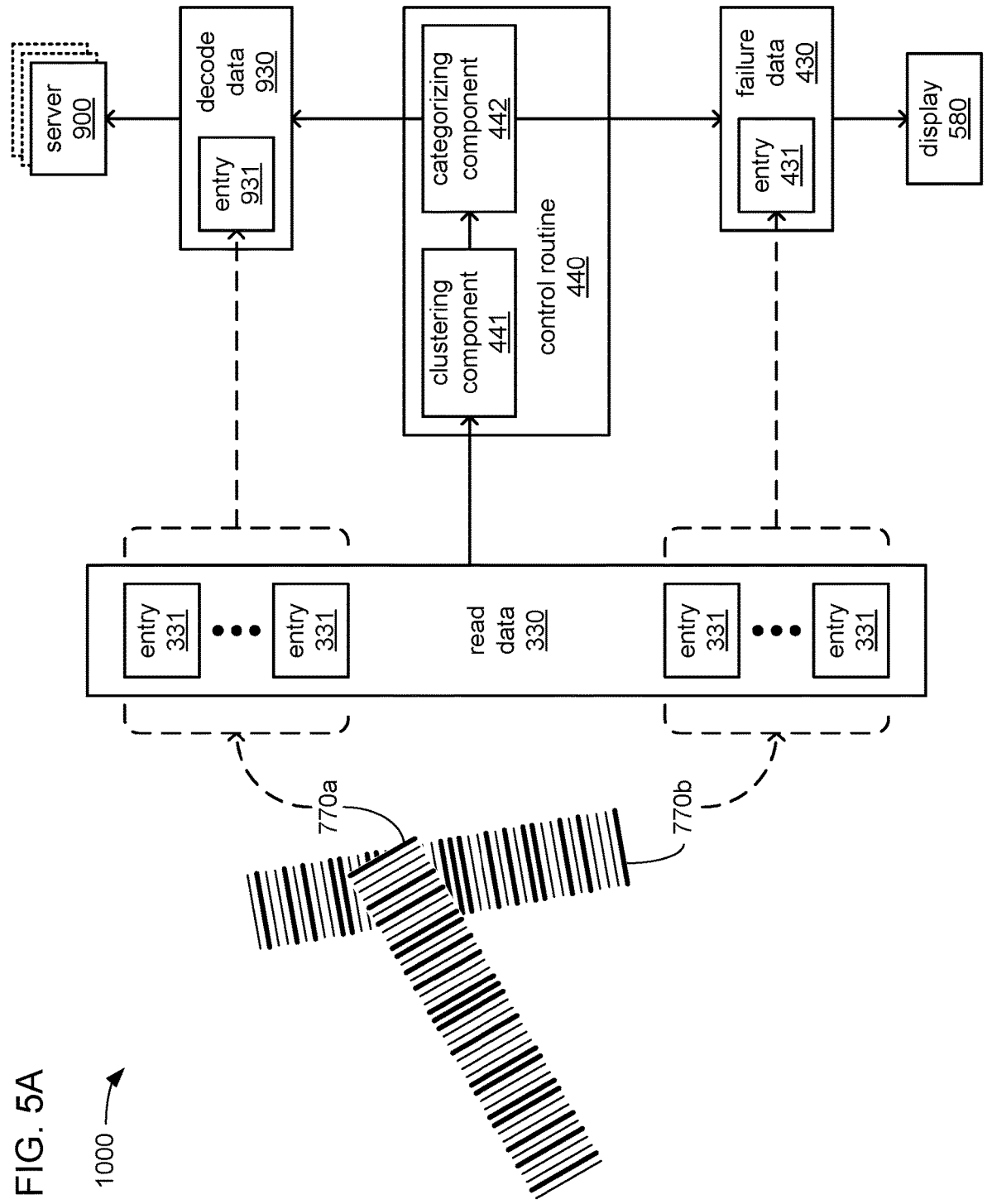
FIGS. 5A, 5B, 5C and 5D, together, show aspects of categorization and clustering of results of attempted reads of barcodes by the decoding system of either FIG. 1A or 1B.

Turning to FIG. 5A, as depicted, the control routine 440 may incorporate a clustering component 441 that may cause processor(s) 550 of the decoding device 500 to analyze indications of location, orientation and direction of the read path of the read attempt associated with each entry 331, as well as identifiers of ROIs 880 associated with each entry 331, to identify, for each barcode 770, a cluster of the entries 331 that correspond to the read attempts that were made for that barcode 770. Thus, and as depicted, such information within each entry 331 may be used to identify entries 331 that correspond to read attempts made to read the depicted barcode 770a, and to define a cluster of the entries 331 that are so associated with the barcode 770a. Similarly, and as also depicted, such information may be similarly used to identify entries 331 that correspond to read attempts made to read the depicted barcode 770b, and to define another cluster of the entries 331 that are so associated with the barcode 770b.

As also depicted, the control routine 440 may also incorporate a categorizing component 442 that may cause processor(s) 550 to analyze indications of results of read attempts within the entries 331 within each cluster to categorize each cluster as indicating either success or failure in attempting to read the barcode 770 that corresponds to each cluster. Alternatively or additionally, for each cluster categorized as a failure in attempting to read the barcode 770 that corresponds thereto, the processor(s) 550 may be caused by the categorization component 442 to further categorize each such cluster with a specific failure type.

Figure 5B:
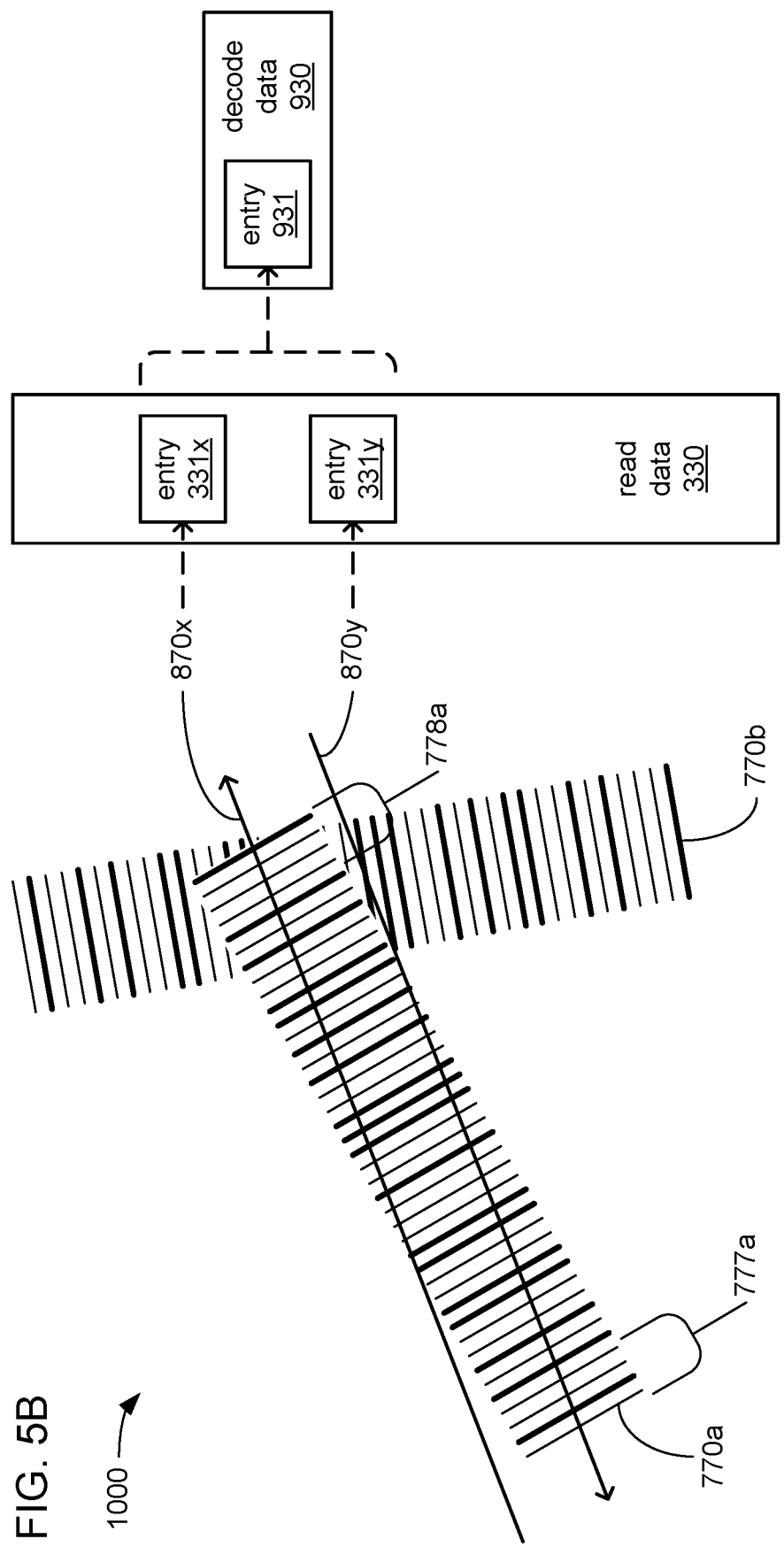

Turning to FIG. 5B, as previously discussed, in some embodiments, it may be that a cluster where all read attempts were unsuccessful is still categorized as a success if portions of encoded data that were read in two or more read attempts of that cluster can be combined to derive the entirety of the data encoded by the corresponding barcode 770. Thus, in a deliberately simplified example depicted in FIG. 5B in which the depicted barcode 770a was only partially read in each of two read attempts performed along depicted read paths 870x and 870y, the cluster corresponding to the barcode 770a may be categorized a success if each of these two read attempts succeeded in gathering large enough portion of the encoded data that those two portions are able to be combined to derive the entirety of the encoded data.

More specifically, and as depicted, one of these two read attempts was performed along the read path 870x such that the stop end 778a and a portion of the data encoded in lines 771 relatively close to the stop end 778a may have been successfully read, and that portion may have been stored in the corresponding entry 331x. Similarly, the other of these two read attempts was performed along the read path 870y such that the start end 777a and another portion of the data encoded in lines 771 relatively close to the start end 777a may have been successfully read, and that other portion may have been stored in the corresponding entry 331y. Following the generation of the entries 331x and 331y, at least these two entries may be subsequently identified as corresponding to the same barcode 770a such that they are clustered together. And then following such clustering, the portions of the encoded data stored within each of entries 331x and 331y may then be combined to derive the entirety of the encoded data, thereby leading to that cluster being categorized as successful, and leading to that derived data being stored within an entry 931 of the decode data 930.

Figure 5C:
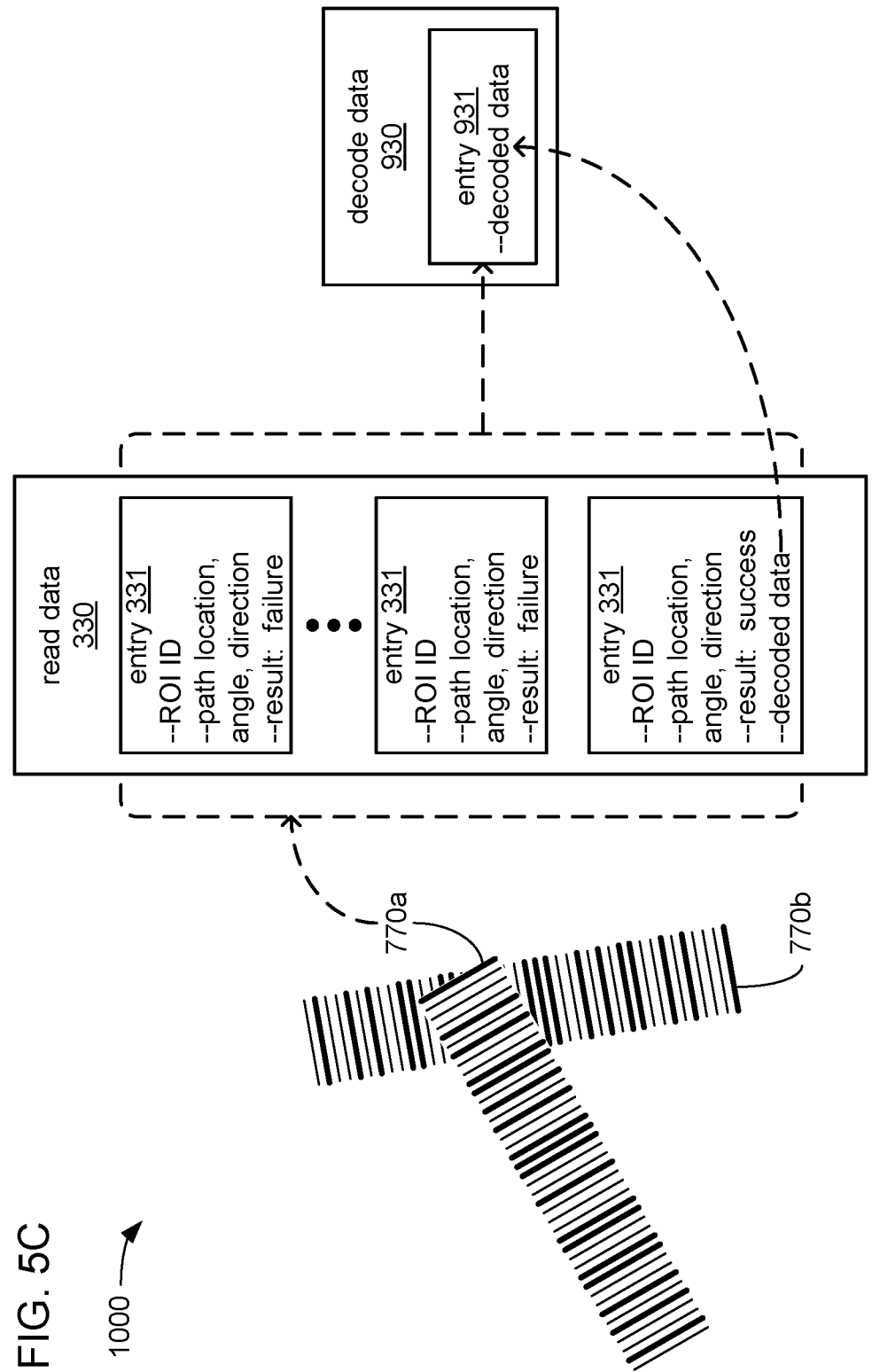

Turning to FIG. 5C, among the entries 331 that have been identified as corresponding to barcode 770a, and therefore clustered together, there is at least one entry 331 that indicates that there was a successful attempt at reading barcode 770a, and that accordingly, includes the decoded data. Thus, the depicted cluster of entries 331 may be categorized as indicating success in the reading of its corresponding barcode 770a. In response, an entry 931 that corresponds to barcode 770a may be generated in the decode data 930 to include the data that was successfully decoded from the barcode 770a. As previously discussed, the decode data 930 may be transmitted via the network 999 to another device, such as one of the servers 900 depicted in FIGS. 1A-B.

Figure 5D:
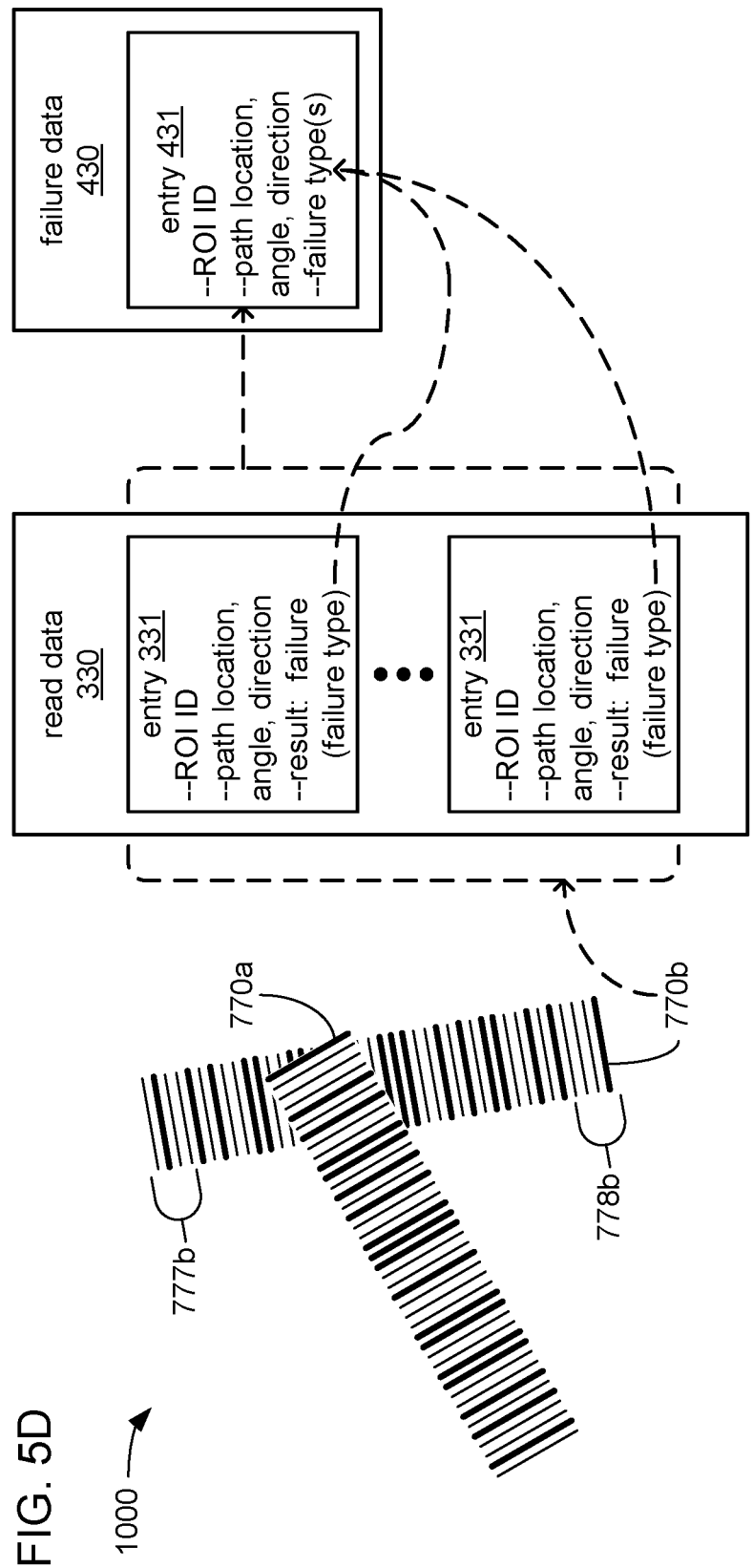

In contrast, and turning to FIG. 5D, among the entries 331 that have been identified as corresponding to barcode 770b, and therefore clustered together, there are no entries 331 that indicate that there was any successful attempt at reading barcode 770b. Thus, the depicted cluster of entries 331 is categorized as indicating failure in the reading of its corresponding barcode 770b. In response, an entry 431 that corresponds to barcode 770b is generated in the failure data 430 to include the information concerning aspects of the ROI 880 sufficient to identify the ROI 880 (e.g., an identifier of the ROI 880), information concerning aspects of at least one of the read attempts (e.g., aspects of its read path 870, etc.), and/or information concerning the type of failure that resulted from at least one of the read attempts (e.g., whether either of the start end or stop end were successfully read, and/or whether any portion of the encoded data was successfully read).

As depicted in FIG. 5D, the ends of the barcode 770b are undamaged and unobstructed such that at least one of the read attempts of the corresponding cluster may have resulted in the successful reading of both the start end 777 and the stop end 778, thereof. Alternatively or additionally, it may be that at least one read attempt of the corresponding cluster resulted in the successful reading of the start end 777 thereof, and at least one other read attempt of that cluster resulted in the successful reading of the stop end 778 thereof. As previously discussed, such a cluster may be categorized as a "dual end" or "broken" cluster, and an indication of such a categorization of failure type may be stored within the entry 431 for that cluster.

As previously discussed, the failure data 430 may be provided to an operator of the decoding system 1000, and such a provision to the operator may be by way of being visually presented on the display 580 of the decoding device 500. As also previously discussed, such provision of the failure data 430 may provide information needed to make changes to the functionality of the system 1000 and/or to the manner in which it is used, including the manner in which barcodes may be applied to objects 700 and/or the manner in which objects 700 are positioned in the FOV(s) 118 of the one or more cameras 100.

In various embodiments, various different approaches may be taken to indicating, in an entry 431 of the failure data 430, the types of failure that may be encountered across multiple attempts to read a barcode 700 where there were no successful attempts (as in the case of the depicted barcode 700b, as a result of being obscured by part of the depicted barcode 700a). In some embodiments, such an entry 431 may be generated to include separate counts of the number of occurrences of each type of failure for each individual read attempt of the multiple read attempts of the corresponding cluster. Thus, it may be that an entry 431 may include a count of the number of failures in which a start end 777 was successfully read, but not the stop end 778; the number of failures in which reverse occurred; and the number of failures in which neither the start end 777 nor the stop end 778 were successfully read. This may provide guidance concerning the relative proportions of such different types of read failure based on different portions of barcodes 770 being obscured in any of a variety of ways (e.g., lighting glare, tears, scuffs, overwriting with ink, etc.).

In some embodiments, each entry 431 may be accompanied within the failure data 430 (or in some other manner) with an image of at least the ROI 880 that includes the corresponding barcode 770 to enable the operator of the decoding system 1000 to have access to a visual record of the situation, from the perspective of at least one camera 100, of what situation may have caused the failure of multiple attempts to read that barcode 770.

Figure 6A:
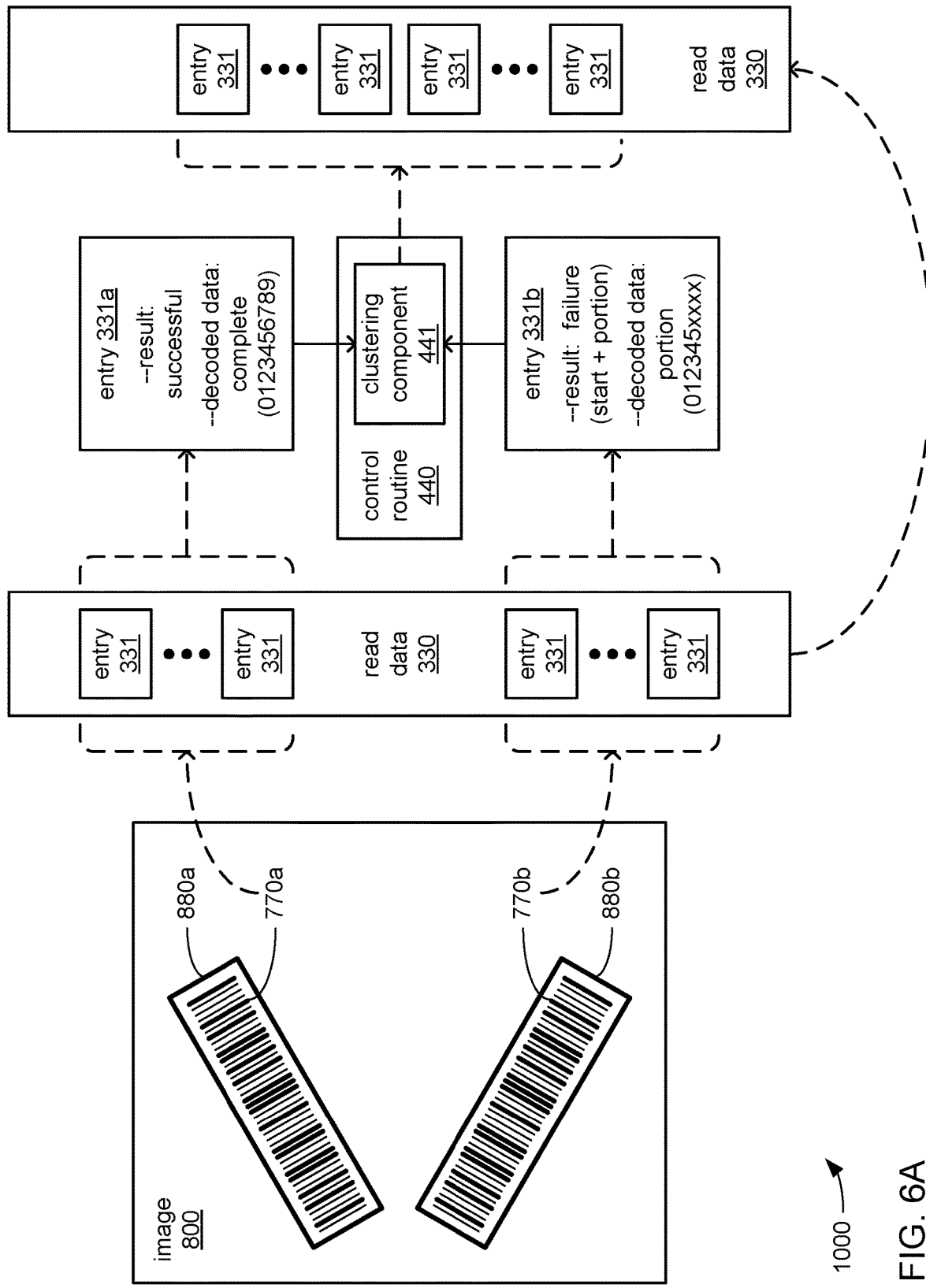
FIGS. 6A and 6B, together, show aspects of further clustering of attempted reads of barcodes across multiple instances of barcodes and across multiple images by the decoding system of either FIG. 1A or 1B.
Figure 6B:
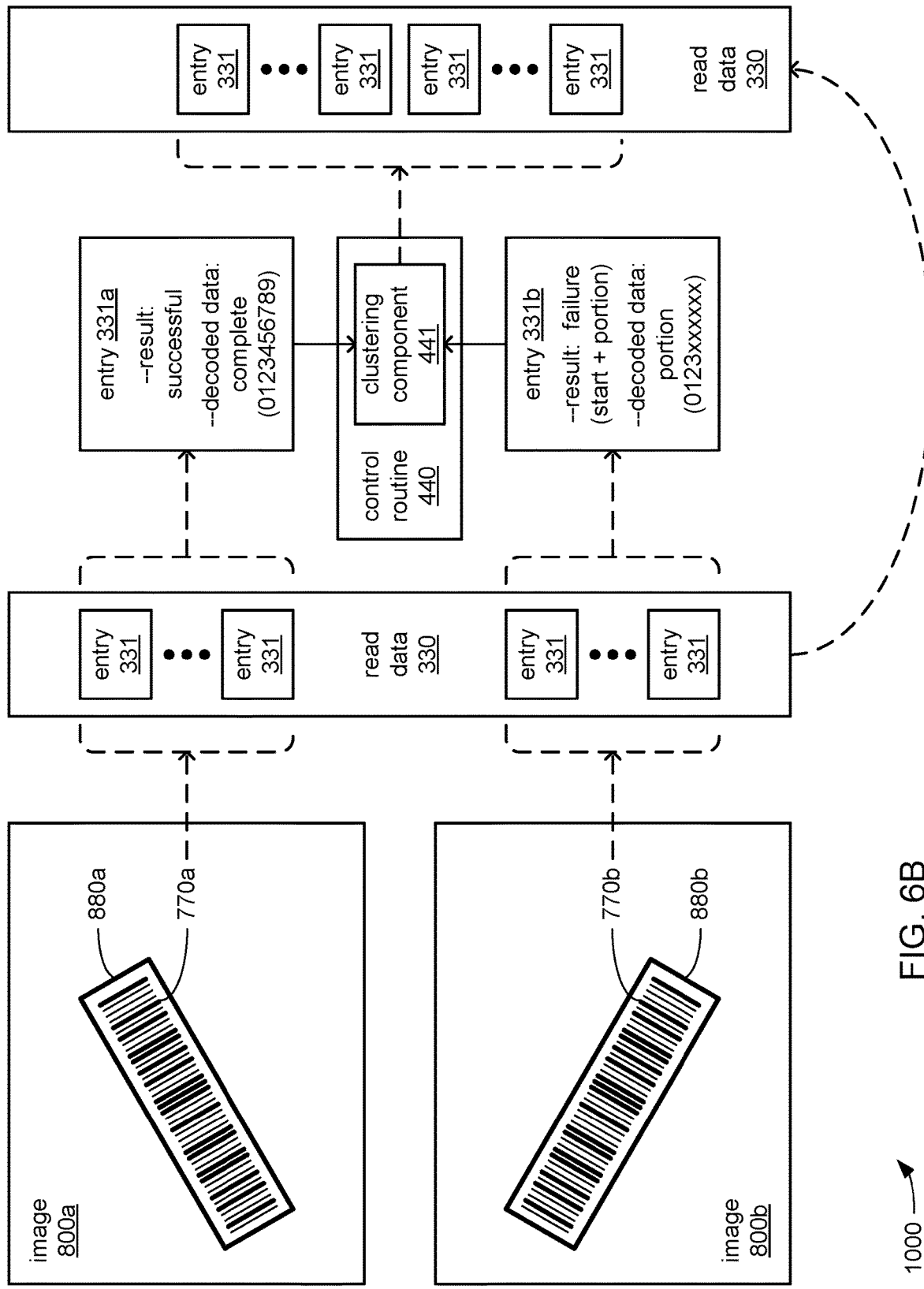

FIGS. 6A and 6B, together, depict aspects of further use of clustering to cluster together multiple entries 331 associated with attempts to read the very same barcode 770 across multiple images 800, and/or multiple entries 331 associated with attempts to read multiple instances of the same barcode 770 within a single image 800 or across multiple images 800.

Referring back to FIG. 2, along with FIGS. 6A-B, as will be familiar to those skilled in the art, it is not uncommon for a single object 700 to carry multiple instances of the same barcode 770 on one or more surfaces 701 thereof. Motivations for doing so may include a desire to ensure that there will be at least one readable instance of a particular barcode 770 even after one or more other instances thereof have been damaged, obscured, or made otherwise unreadable. As a result, multiple instances of the same barcode 770 may be present within a single image 800 captured by a single camera 100, and/or may be present within multiple images 800 of the same object 700 captured by multiple cameras 100. Alternatively or additionally, it may be that a single camera 100 captures multiple images 800 of the same object 700 over a span of time such that the very same instance of a barcode 770 may be present across more than one of those multiple images 800.

As will also be familiar to those skilled in the art, even where there are multiple instances of the same barcode 700 that are undamaged and unobscured, it may be that differences in conditions under which images 800 are captured of each of those instances are captured cause different ones of those multiple instances to be readable and unreadable in different ones of those multiple images 800. More specifically, while an instance of a barcode 770 may be easily and clearly readable in one image 800 captured under one set of conditions (e.g., angle of skew, lighting, etc.), that same instance may be far less readable in another image 800 captured under another set of conditions (e.g., different angle of skew, different lighting, etc.). In response to this, in some embodiments, further clustering may be performed to at least reduce the number of clusters that are categorized as failures where the data encoded in their corresponding barcodes was successfully read from the same barcode 770 as captured in another image 800, and/or was successfully read from another instance of the same barcode 770.

Turning more specifically to FIG. 6A, the clustering that was earlier described in connection with FIGS. 5A-D focused on identifying and clustering together read attempts that are made to read the very same instance of the very same barcode 770 within the very same ROI 880 within the very same image 800—what might be referred to as "per-ROI" clustering. Following the performance of such "per-ROI" clustering, further "per-image" clustering may be performed in which the read attempts of clusters that correspond to barcodes 770 present within a single image 800 may be analyzed to identify clusters that correspond to multiple instances of the same barcode 770 within that same single image 800. Such a "per-image" analysis of clusters of read attempts may be performed in embodiments of the decoding system 1000 in which there may be just a single camera 100 that may be used to capture just a single image 800 of an object 700.

More specifically, and as depicted in the deliberately simplified example depicted in FIG. 6A, earlier performed "per-ROI" clustering may have created a cluster of entries 331 for attempts made to read the depicted barcode 770a within the depicted ROI 880a within the depicted image 800, and another cluster of entries 331 for attempts made to read the depicted barcode 770b within the depicted ROI 880b within the same image 800. Further execution of the clustering component 441 may cause processor(s) 550 of the decoding device 500 to identify, from each of these two clusters, a read attempt in which the largest portion of the data encoded within the corresponding barcode 770a and 770b, respectively, was successfully read. As depicted, from within the cluster associated with the barcode 770a, an entry 331a is identified for a read attempt in which the entirety of the encoded data of the barcode 770a was successfully read. In contrast, from within the cluster associated with the barcode 770b, an entry 331b is identified for a read attempt in which just a portion of the encoded data of the barcode 770b was successfully read.

The processor(s) 550 may then compare what was decoded in each of these two read attempts to determine if the overlapping parts thereof are a perfect match, and if those overlapping parts represent a large enough part of the two barcodes 770a and 770b as to be deemed useable in determining whether the same data is encoded in both of the barcodes 770a and 770b such that they may be deemed to be two instances of the same barcode 770. As depicted, the portion that was successfully read from the barcode 770b includes 6 of the 10 characters that may be expected to be encoded within the barcode 770b such that 60% of the data encoded within the barcode 770b was successfully read. This 60% measure of this portion may be compared to a pre-defined minimum portion threshold to determine whether this portion is large enough. As depicted, it may be that 60% is large enough to meet the threshold, and as also depicted, the overlapping parts of what was decoded in each of these two read attempts is a perfect match such that the barcodes 770a and 770b are deemed to be two instances of the same barcode 770. As depicted, in response to such determinations having been made, the two separate clusters that each corresponded to one of the two barcodes 770a and 770b may be combined into a single cluster that corresponds to both barcodes 770a and 770b.

Turning more specifically to FIG. 6B, although such "per-ROI" clustering and such further "per-image" clustering may be sufficient where there is just a single image 800 captured of an object 700, still further clustering may be performed where there are multiple images captured of the same object 700. In other words, a form of "multi-image" clustering may need to be performed (in addition to the "per-ROI" and "per-image" clustering) in embodiments of the decoding system 1000 in which a single camera 100 is used to capture multiple images of the same object 700 over time, and/or in embodiments of the decoding system 1000 in which there are multiple cameras 100 used to capture multiple images of the same object 700.

More specifically, and as depicted in the deliberately simplified example depicted in FIG. 6B, earlier performed "per-ROI" clustering may have created a cluster of entries 331 for attempts made to read the depicted barcode 770a within the depicted ROI 880a within the depicted image 800a, and another cluster of entries 331 for attempts made to read the depicted barcode 770b within the depicted ROI 880b within the other depicted image 800b. Additionally, and although not specifically shown, it may be that further "per-image" clustering has also been separately performed for clusters of read attempts within each image 800a and 800b such that one or both of the depicted clusters of entries 331 may include attempts made to read still another barcode (not shown) within the same one of the images 800a or 800b.

Regardless of whether just "per-ROI" clustering has been performed, or "per-image" clustering has also been performed, further execution of the clustering component 441 may cause processor(s) 550 of the decoding device 500 to identify, from each of these two clusters from different ones of the images 800a and 800b, a read attempt in which the largest portion of the data encoded within the corresponding barcode 770a and 770b, respectively, was successfully read. As depicted, from within the cluster associated with the barcode 770a, an entry 331a is identified for a read attempt in which the entirety of the encoded data of the barcode 770a was successfully read. In contrast, from within the cluster associated with the barcode 770b, an entry 331b is identified for a read attempt in which just a portion of the encoded data of the barcode 770b was successfully read.

The processor(s) 550 may then compare what was decoded in each of these two read attempts to determine if the overlapping parts thereof are a perfect match, and if those overlapping parts represent a large enough part of the two barcodes 770a and 770b as to be deemed useable in determining whether the same data is encoded in both of the barcodes 770a and 770b such that they may be deemed to be two instances of the same barcode 770, or two images of the same instance of a barcode 770. As depicted, the portion that was successfully read from the barcode 770*b* includes 4 of the 10 characters that may be expected to be encoded within the barcode 770*b* such that just 40% of the data encoded within the barcode 770*b* was successfully read. This 40% measure of this portion may be compared to a pre-defined minimum portion threshold to determine whether this portion is large enough. As depicted, it may be that 40% is large enough to meet the threshold, and as also depicted, the overlapping parts of what was decoded in each of these two read attempts is a perfect match such that the barcodes 770*a* and 770*b* are deemed to be two instances of the same barcode 770, or two images of the same instance of a barcode 770. As depicted, in response to such determinations having been made, the two separate clusters that each corresponded to one of the two barcodes 770*a* and 770*b* may be combined into a single cluster that corresponds to both barcodes 770*a* and 770*b*.

Alternatively, it may be that 40% is not large enough to meet the pre-defined minimum portion threshold such that the portion that was successfully read from the barcode 770*b* is not deemed to be useable in such a comparison in a performance of "multi-image" clustering. Although not depicted, in response to such a determination having been made, the two separate clusters that each correspond to one of the two barcodes 770*a* and 770*b* may be caused to remain separate clusters.

It should be noted that, like the "per-ROI" clustering described in reference to FIGS. 5A-D, such "per-image" and "multi-image" clustering just described in reference to FIGS. 6A-B may also be performed before any performance of the categorization that is also described in reference to FIGS. 5A-D. In this way, there may be fewer clusters overall to categorize, and more of a likelihood that a higher proportion of the clusters may be categorized as successful.

There is thus disclosed a system to capture and decode encoded data. The features set forth below may be combined in any of a variety of ways to create any of a variety of embodiments of a decoding device, a decoding system and/or a method of decoding data encoded within encoded data markings.

A decoding device includes storage configured to store image data comprising a first image captured by a first camera of an object, and a processor communicatively coupled to the storage. The processor is configured to perform operations including: analyze the first image to derive boundaries of a first region of interest (ROI) within which at least one barcode is present, and to identify at least one angle of orientation of the at least one barcode; derive multiple read paths for multiple read operations to be attempted within the first ROI based on the at least one angle of orientation of the at least one barcode; attempt each read operation of the multiple read operations within the first ROI along a different one of the read paths of the multiple read paths to attempt to read data encoded within a first barcode of the at least one barcode; analyze the read path of each read operation of the multiple read operations to identify a first cluster of read operations of the multiple read operations that are associated with attempts to read the first barcode; analyze results of each read operation within the first cluster to identify each read operation in which data encoded within the first barcode was successfully fully read; and in response to at least one read operation within the first cluster resulting in the data encoded within the first barcode being successfully fully read, provide an indication of the data encoded within the first barcode to another device. The processor is also configured to, in response to a lack of success in fully reading the data encoded within the first barcode among the read operations within the first cluster, perform operations including: for each read operation within the first cluster, analyze the results to determine whether a start end of the first barcode was successfully read, and to determine whether a stop end of the first barcode was successfully read; and store, as part of a set of indications of read failures in the storage for a set of barcodes that includes the first barcode, an indication of at least whether both the start end and the stop end of the first barcode were successfully read in any read operation within the first cluster.

Analyzing the first image to derive the boundaries of the first ROI may include performing operations including: analyze the first image to identify an anchor marking; derive the boundaries of the first ROI and an angle of orientation of the first ROI based on a size, a location and an angle of orientation of the anchor marking within the first image; and define the at least one angle of orientation of the at least one barcode as comprising the angle of orientation of the first ROI.

Analyzing the first image to derive the boundaries of the first ROI may include performing operations including: divide the first image into a two-dimensional (2D) array of tiles that each comprise a 2D array of pixels; for each tile of the 2D array of tiles, use data values indicative of color and/or brightness of the 2D array of pixels to derive a degree of likelihood of multiple parallel light and dark lines being present within the tile, and an angle of orientation of the multiple parallel light and dark lines; identify, as the first ROI, a set of contiguously adjacent tiles that each have a degree of likelihood of having multiple parallel light and dark lines that meets a pre-defined threshold of likelihood of having multiple parallel light and dark lines present; define the boundaries of the first ROI as the boundaries of the set of contiguously adjacent tiles; and define the at least one angle of orientation of the at least one barcode as comprising the angle of orientation of the multiple parallel light and dark lines derived for each tile of the set of contiguously adjacent tiles.

Deriving the multiple read paths may include performing operations including: derive a first subset of read paths that extend in parallel from a portion of the boundary of the first ROI and into the first ROI at a first angle of orientation that varies from the at least one angle of orientation of the at least one barcode to a first degree that falls within a pre-determined range of variation in angle; and derive a second subset of read paths that extend in parallel from the portion of the boundary of the first ROI and into the first ROI at a second angle of orientation that varies from the at least one angle of orientation of the at least one barcode to a second degree that falls within the pre-determined range of variation in angle.

Analyzing the read path of each read operation of the multiple read operations to identify the first cluster of read operations may include performing operations including: separate the multiple read operations attempted within the first ROI from other read operations attempted within another ROI; for each read operation of the multiple read operations attempted within the first ROI, identify a subset of read operations of the multiple read operations that were attempted along read paths that each have an angle of orientation that is similar to the read paths of the other read operations within the subset within a pre-determined range of variation in angle; and define the first cluster of read operations as comprising the subset of read operations.

Successfully reading the start end of the first barcode may include successfully reading a start symbol encoded by lines at the start end of the first barcode, and successfully reading the stop end of the first barcode may include successfully reading a stop symbol encoded by lines at the stop end of the first barcode.

The processor may be further configured to, in response to a lack of success in fully reading the data encoded within the first barcode among the read operations within the first cluster, and in response to a lack of success in fully reading data encoded within a second barcode among a second cluster of read operations within a second ROI within a second image captured by a second camera, perform operations including: for each read operation within the first cluster, analyze the results to identify a largest successfully read portion of the data that is encoded within the first barcode at a location adjacent to the start end of the first barcode, and to identify a largest successfully read portion of the data that is encoded within the first barcode at a location adjacent to the stop end of the first barcode; for each read operation within the second cluster, analyze the results to identify a largest successfully read portion of the data that is encoded within the second barcode at a location adjacent to the start end of the second barcode, and to identify a largest successfully read portion of the data that is encoded within the first barcode at a location adjacent to the stop end of the second barcode. The processor may be additionally configured to determine whether the first barcode in the first image and the second barcode in the second image are the same barcode based on at least one of: a comparison of the largest successfully read portion of the data that is encoded within the first barcode at the location adjacent to the start end of the first barcode to the largest successfully read portion of the data that is encoded within the second barcode at the location adjacent to the start end of the second barcode; and a comparison of the largest successfully read portion of the data that is encoded within the first barcode at the location adjacent to the stop end of the first barcode to the largest successfully read portion of the data that is encoded within the second barcode at the location adjacent to the stop end of the second barcode. The processor may be additionally configured to, in response to a determination that the first barcode and the second barcode are the same barcode, add each of the read operations of the second cluster to the first cluster before analyzing the results of each read operation within the first cluster to determine whether the start end of the first barcode was successfully read, and to determine whether the stop end of the first barcode was successfully read.

The processor may be further configured to perform operations including, in response to a lack of success in fully reading the data encoded within the first barcode, and in response to a lack of success in reading both the start end and the stop end of the first barcode, store, as part of the set of indications of read failures in the storage, an indication of whether either of the start end or the stop end of the first barcode was successfully read in any read operation within the first cluster.

The processor may be further configured to perform operations including: generate a set of statistics indicative of at least relative proportions of read failures among the set of barcodes in which both the start end and the stop end were successfully read, read failures among the set of barcodes in which just the start end was successfully read, and read failures among the set of barcodes in which just the stop end was successfully read; and operate a display to visually present the set of statistics.

The processor may be further configured to, prior to analyzing the results of each read operation within the first cluster to identify each read operation in which data encoded within the first barcode was successfully read, perform operations including: for each read operation within the first cluster, analyze the results to identify a first largest successfully read portion of the data that is encoded within the first barcode; for each read operation within a second cluster of read operations within a second ROI within the first image, analyze results of each read operation within the second cluster to identify a second largest successfully read portion of the data that is encoded within a second barcode; compare a part of the first largest successfully read portion to a part of the second largest successfully read portion that the part of the first largest successfully read portion overlaps to determine whether the part of the first largest successfully read portion matches the part of the second largest successfully read portion; compare a size of the overlapping parts of the first and second largest successfully read portions to a pre-defined minimum portion threshold to determine whether the size at least meets the threshold; and in response to the size meeting the threshold, and in response to the parts of the first and second largest successfully read portions matching, add each of the read operations of the second cluster to the first cluster.

The processor may be further configured to, in response to a lack of success in fully reading the data encoded within the first barcode, and prior to generating the indication of lack of success, perform operations including: analyze any portion of the data encoded within the first barcode that was read in any read operation within the first cluster to determine whether the data encoded within the first barcode is able to be fully derived by combining portions of the data encoded within the first barcode that were read in read operations within the first cluster; in response to a determination that the data encoded within the first barcode is able to be fully derived, refrain from generating the indication of lack of success, and provide the indication of the data encoded within the first barcode to another device; and in response to a determination that the data encoded within the first barcode is not able to be fully derived, proceed with generating the indication of lack of success.

A decoding system includes multiple cameras, wherein each camera comprises an image sensor configured to capture an image of multiple images of an object, and a processor communicatively coupled to the multiple cameras. The processor is configured, for each image of the multiple images, to perform operations including: analyze the image to derive boundaries of a region of interest (ROI) within which at least one barcode is present, and to identify at least one angle of orientation of the at least one barcode; derive multiple read paths for multiple read operations to be attempted within the ROI based on the at least one angle of orientation of the at least one barcode; attempt each read operation of the multiple read operations within the ROI along a different one of the read paths of the multiple read paths to attempt to read data encoded within a single barcode of the at least one barcode; analyze the read path of each read operation of the multiple read operations to identify a single cluster of read operations of the multiple read operations that are associated with attempts to read the single barcode; add, to the single cluster, read operations associated with attempts to read the same single barcode within another ROI of within another image of the multiple images; analyze results of each read operation within the single cluster to identify each read operation in which data encoded within the single barcode was successfully fully read; and in response to at least one read operation within the single cluster resulting in the data encoded within the single barcode being successfully fully read, provide an indication of the data encoded within the single barcode to another device. The processor is further configured to, in response to a lack of success in fully reading the data encoded within the single barcode among the read operations within the single cluster, perform operations including: for each read operation within the single cluster, analyze the results to determine whether a start end of the single barcode was successfully read, and to determine whether a stop end of the single barcode was successfully read; and store, as part of a set of indications of read failures in the storage for a set of barcodes that includes the single barcode, an indication of at least whether both the start end and the stop end of the single barcode were successfully read in any read operation within the single cluster.

Analyzing the image to derive the boundaries of the ROI may include performing operations including: analyze the image to identify an anchor marking; derive the boundaries of the ROI and an angle of orientation of the ROI based on a size, a location and an angle of orientation of the anchor marking within the image; and define the at least one angle of orientation of the at least one barcode as comprising the angle of orientation of the ROI.

Analyzing the image to derive the boundaries of the ROI may include performing operations including: divide the image into a two-dimensional (2D) array of tiles that each comprise a 2D array of pixels; for each tile of the 2D array of tiles, use data values indicative of color and/or brightness of the 2D array of pixels to derive a degree of likelihood of multiple parallel light and dark lines being present within the tile, and an angle of orientation of the multiple parallel light and dark lines; identify, as the ROI, a set of contiguously adjacent tiles that each have a degree of likelihood of having multiple parallel light and dark lines that meets a pre-defined threshold of likelihood of having multiple parallel light and dark lines present; define the boundaries of the ROI as the boundaries of the set of contiguously adjacent tiles; and define the at least one angle of orientation of the at least one barcode as comprising the angle of orientation of the multiple parallel light and dark lines derived for each tile of the set of contiguously adjacent tiles.

Deriving the multiple read paths may include performing operations including: derive a first subset of read paths that extend in parallel from a portion of the boundary of the ROI and into the ROI at a first angle of orientation that varies from the at least one angle of orientation of the at least one barcode to a first degree that falls within a pre-determined range of variation in angle; and derive a second subset of read paths that extend in parallel from the portion of the boundary of the ROI and into the ROI at a second angle of orientation that varies from the at least one angle of orientation of the at least one barcode to a second degree that falls within the pre-determined range of variation in angle.

Analyzing the read path of each read operation of the multiple read operations to identify the single cluster of read operations may include performing operations including: separate the multiple read operations attempted within the ROI from other read operations attempted within another ROI within the image; for each read operation of the multiple read operations attempted within the ROI, identify a subset of read operations of the multiple read operations that were attempted along read paths that each have an angle of orientation that is similar to the read paths of the other read operations within the subset within a pre-determined range of variation in angle; and define the single cluster of read operations as comprising the subset of read operations.

Successfully reading the start end of the single barcode may include successfully reading a start symbol encoded by lines at the start end of the single barcode; and successfully reading the stop end of the single barcode may include successfully reading a stop symbol encoded by lines at the stop end of the single barcode.

A method includes: receiving, at a decoding device, image data from a first camera of a first image captured by the first camera of an object; analyzing, by a processor of the decoding device, the first image to derive boundaries of a first region of interest (ROI) within which at least one barcode is present, and to identify at least one angle of orientation of the at least one barcode; deriving, by the processor, multiple read paths for multiple read operations to be attempted within the first ROI based on the at least one angle of orientation of the at least one barcode; attempting each read operation of the multiple read operations within the first ROI along a different one of the read paths of the multiple read paths to attempt to read data encoded within a first barcode of the at least one barcode; analyzing, by the processor, the read path of each read operation of the multiple read operations to identify a first cluster of read operations of the multiple read operations that are associated with attempts to read the first barcode; analyzing, by the processor, results of each read operation within the first cluster to identify each read operation in which data encoded within the first barcode was successfully fully read; and in response to at least one read operation within the first cluster resulting in the data encoded within the first barcode being successfully fully read, providing an indication of the data encoded within the first barcode to another device via a network. The method further includes, in response to a lack of success in fully reading the data encoded within the first barcode among the read operations within the first cluster, performing operations including: for each read operation within the first cluster, analyzing, by the processor, the results to determine whether a start end of the first barcode was successfully read, and to determine whether a stop end of the first barcode was successfully read; and storing, in a storage communicatively coupled to the processor, and as part of a set of indications of read failures for a set of barcodes that includes the first barcode, an indication of at least whether both the start end and the stop end of the first barcode were successfully read in any read operation within the first cluster.

Analyzing the first image to derive the boundaries of the first ROI may include: analyzing, by the processor, the first image to identify an anchor marking; deriving the boundaries of the first ROI and an angle of orientation of the first ROI based on a size, a location and an angle of orientation of the anchor marking within the first image; and defining the at least one angle of orientation of the at least one barcode as comprising the angle of orientation of the first ROI.

Analyzing the first image to derive the boundaries of the first ROI may include: dividing the first image into a two-dimensional (2D) array of tiles that each comprise a 2D array of pixels; for each tile of the 2D array of tiles, using, by the processor, data values indicative of color and/or brightness of the 2D array of pixels to derive a degree of likelihood of multiple parallel light and dark lines being present within the tile, and an angle of orientation of the multiple parallel light and dark lines; identifying, as the first ROI, a set of contiguously adjacent tiles that each have a degree of likelihood of having multiple parallel light and dark lines that meets a pre-defined threshold of likelihood of having multiple parallel light and dark lines present; defining the boundaries of the first ROI as the boundaries of the set of contiguously adjacent tiles; and defining the at least one angle of orientation of the at least one barcode as comprising the angle of orientation of the multiple parallel light and dark lines derived for each tile of the set of contiguously adjacent tiles.

Deriving the multiple read paths may include: deriving, by the processor, a first subset of read paths that extend in parallel from a portion of the boundary of the first ROI and into the first ROI at a first angle of orientation that varies from the at least one angle of orientation of the at least one barcode to a first degree that falls within a pre-determined range of variation in angle; and deriving, by the processor, a second subset of read paths that extend in parallel from the portion of the boundary of the first ROI and into the first ROI at a second angle of orientation that varies from the at least one angle of orientation of the at least one barcode to a second degree that falls within the pre-determined range of variation in angle.

Analyzing the read path of each read operation of the multiple read operations to identify the first cluster of read operations may include: separating the multiple read operations attempted within the first ROI from other read operations attempted within another ROI; for each read operation of the multiple read operations attempted within the first ROI, identifying a subset of read operations of the multiple read operations that were attempted along read paths that each have an angle of orientation that is similar to the read paths of the other read operations within the subset within a pre-determined range of variation in angle; and defining the first cluster of read operations as comprising the subset of read operations.

Successfully reading the start end of the first barcode may include successfully reading a start symbol encoded by lines at the start end of the first barcode; and successfully reading the stop end of the first barcode may include successfully reading a stop symbol encoded by lines at the stop end of the first barcode.

The method may further include, in response to a lack of success in fully reading the data encoded within the first barcode among the read operations within the first cluster, and in response to a lack of success in fully reading data encoded within a second barcode among a second cluster of read operations within a second ROI within a second image captured by a second camera, performing operations including: for each read operation within the first cluster, analyzing, by the processor, the results to identify a largest successfully read portion of the data that is encoded within the first barcode at a location adjacent to the start end of the first barcode, and to identify a largest successfully read portion of the data that is encoded within the first barcode at a location adjacent to the stop end of the first barcode; and for each read operation within the second cluster, analyzing, by the processor, the results to identify a largest successfully read portion of the data that is encoded within the second barcode at a location adjacent to the start end of the second barcode, and to identify a largest successfully read portion of the data that is encoded within the first barcode at a location adjacent to the stop end of the second barcode. The method may additionally include, determining, by the processor, whether the first barcode in the first image and the second barcode in the second image are the same barcode based on at least one of: a comparison of the largest successfully read portion of the data that is encoded within the first barcode at the location adjacent to the start end of the first barcode to the largest successfully read portion of the data that is encoded within the second barcode at the location adjacent to the start end of the second barcode; and a comparison of the largest successfully read portion of the data that is encoded within the first barcode at the location adjacent to the stop end of the first barcode to the largest successfully read portion of the data that is encoded within the second barcode at the location adjacent to the stop end of the second barcode. The method may additionally include, in response to a determination that the first barcode and the second barcode are the same barcode, adding each of the read operations of the second cluster to the first cluster before analyzing the results of each read operation within the first cluster to determine whether the start end of the first barcode was successfully read, and to determine whether the stop end of the first barcode was successfully read.

The method may further include, in response to a lack of success in fully reading the data encoded within the first barcode, and in response to a lack of success in reading both the start end and the stop end of the first barcode, storing, as part of the set of indications of read failures in the storage, an indication of whether either of the start end or the stop end of the first barcode was successfully read in any read operation within the first cluster.

The method may further include: generating a set of statistics indicative of at least relative proportions of read failures among the set of barcodes in which both the start end and the stop end were successfully read, read failures among the set of barcodes in which just the start end was successfully read, and read failures among the set of barcodes in which just the stop end was successfully read; and operating a display to visually present the set of statistics.

The method may further include, prior to analyzing the results of each read operation within the first cluster to identify each read operation in which data encoded within the first barcode was successfully read, performing operations including: for each read operation within the first cluster, analyzing, by the processor, the results to identify a first largest successfully read portion of the data that is encoded within the first barcode; for each read operation within a second cluster of read operations within a second ROI within the first image, analyzing, by the processor, results of each read operation within the second cluster to identify a second largest successfully read portion of the data that is encoded within a second barcode; comparing a part of the first largest successfully read portion to a part of the second largest successfully read portion that the part of the first largest successfully read portion overlaps to determine whether the part of the first largest successfully read portion matches the part of the second largest successfully read portion; comparing a first size of the overlapping parts of the first and second largest successfully read portions to a pre-defined minimum portion threshold to determine whether the first size at least meets the threshold; and in response to the first size meeting the threshold, and in response to the parts of the first and second largest successfully read portions matching, adding each of the read operations of the second cluster to the first cluster.

The method may further include, prior to analyzing the results of each read operation within the first cluster to identify each read operation in which data encoded within the first barcode was successfully read, performing operations including: for each read operation within a third cluster of read operations within a third ROI within a second image, analyzing, by the processor, results of each read operation within the third cluster to identify a third largest successfully read portion of the data that is encoded within a third barcode; comparing another part of the first largest successfully read portion to a part of the third largest successfully read portion that the other part of the first largest successfully read portion overlaps to determine whether the other part of the first largest successfully read portion matches the part of the third largest successfully read portion; comparing a second size of the overlapping parts of the third largest successfully read portion and the other part of the first largest successfully read portion to the pre-defined minimum portion threshold to determine whether the second size at least meets the threshold; and in response to the second size meeting the threshold, and in response to the part of the third largest successfully read portion matching the other part of the first largest successfully read portion, adding each of the read operations of the third cluster to the first cluster.

The invention claimed is:

1. A decoding device comprising:
   storage configured to store image data comprising a first image captured by a first camera of an object; and
   a processor communicatively coupled to the storage, the processor configured to perform operations comprising:
      analyze the first image to derive boundaries of a first region of interest (ROI) within which at least one barcode is present, and to identify at least one angle of orientation of the at least one barcode;
      derive multiple read paths for multiple read operations to be attempted within the first ROI based on the at least one angle of orientation of the at least one barcode;
      attempt each read operation of the multiple read operations within the first ROI along a different one of the read paths of the multiple read paths to attempt to read data encoded within a first barcode of the at least one barcode;
      analyze the read path of each read operation of the multiple read operations to identify a first cluster of read operations of the multiple read operations that are associated with attempts to read the first barcode;
      analyze results of each read operation within the first cluster to identify each read operation in which data encoded within the first barcode was successfully fully read;
      in response to at least one read operation within the first cluster resulting in the data encoded within the first barcode being successfully fully read, provide an indication of the data encoded within the first barcode to another device; and
      in response to a lack of success in fully reading the data encoded within the first barcode among the read operations within the first cluster, generating an indication of the lack of success.

2. The decoding device of claim 1, wherein generating the indication of the lack of success comprises performing operations comprising:
   for each read operation within the first cluster, analyze the results to determine whether a start end of the first barcode was successfully read, and to determine whether a stop end of the first barcode was successfully read; and
   generate, as part of a set of indications of read failures for a set of barcodes that includes the first barcode, an indication of at least whether both the start end and the stop end of the first barcode were successfully read in any read operation within the first cluster.

3. The decoding device of claim 1, wherein analyzing the first image to derive the boundaries of the first ROI comprises performing operations comprising:
   analyze the first image to identify an anchor marking;
   derive the boundaries of the first ROI and an angle of orientation of the first ROI based on a size, a location and an angle of orientation of the anchor marking within the first image; and
   define the at least one angle of orientation of the at least one barcode as comprising the angle of orientation of the first ROI.

4. The decoding device of claim 1, wherein analyzing the first image to derive the boundaries of the first ROI comprises performing operations comprising:
   divide the first image into a two-dimensional (2D) array of tiles that each comprise a 2D array of pixels;
   for each tile of the 2D array of tiles, use data values indicative of color and/or brightness of the 2D array of pixels to derive a degree of likelihood of multiple parallel light and dark lines being present within the tile, and an angle of orientation of the multiple parallel light and dark lines;
   identify, as the first ROI, a set of contiguously adjacent tiles that each have a degree of likelihood of having multiple parallel light and dark lines that meets a pre-defined threshold of likelihood of having multiple parallel light and dark lines present;
   define the boundaries of the first ROI as the boundaries of the set of contiguously adjacent tiles; and
   define the at least one angle of orientation of the at least one barcode as comprising the angle of orientation of the multiple parallel light and dark lines derived for each tile of the set of contiguously adjacent tiles.

5. The decoding device of claim 1, wherein deriving the multiple read paths comprises performing operations comprising:
   derive a first subset of read paths that extend in parallel from a portion of the boundary of the first ROI and into the first ROI at a first angle of orientation that varies from the at least one angle of orientation of the at least one barcode to a first degree that falls within a pre-determined range of variation in angle; and
   derive a second subset of read paths that extend in parallel from the portion of the boundary of the first ROI and into the first ROI at a second angle of orientation that varies from the at least one angle of orientation of the at least one barcode to a second degree that falls within the pre-determined range of variation in angle.

6. The decoding device of claim 1, wherein analyzing the read path of each read operation of the multiple read operations to identify the first cluster of read operations comprises performing operations comprising:
   separate the multiple read operations attempted within the first ROI from other read operations attempted within another ROI;
   for each read operation of the multiple read operations attempted within the first ROI, identify a subset of read operations of the multiple read operations that were attempted along read paths that each have an angle of orientation that is similar to the read paths of the other read operations within the subset within a pre-determined range of variation in angle; and
   define the first cluster of read operations as comprising the subset of read operations.

7. The decoding device of claim 1, wherein the processor is further configured to, prior to analyzing the results of each read operation within the first cluster to identify each read operation in which data encoded within the first barcode was successfully read, perform operations comprising:

for each read operation within the first cluster, analyze the results to identify a first largest successfully read portion of the data that is encoded within the first barcode;

for each read operation within a second cluster of read operations within a second ROI within the first image, analyze results of each read operation within the second cluster to identify a second largest successfully read portion of the data that is encoded within a second barcode;

compare a part of the first largest successfully read portion to a part of the second largest successfully read portion that the part of the first largest successfully read portion overlaps to determine whether the part of the first largest successfully read portion matches the part of the second largest successfully read portion;

compare a size of the overlapping parts of the first and second largest successfully read portions to a pre-defined minimum portion threshold to determine whether the size at least meets the threshold; and in response to the size meeting the threshold, and in response to the parts of the first and second largest successfully read portions matching, add each of the read operations of the second cluster to the first cluster.

8. The decoding device of claim 1, wherein the processor is further configured to, in response to a lack of success in fully reading the data encoded within the first barcode, and prior to generating the indication of lack of success, perform operations comprising:

analyze any portion of the data encoded within the first barcode that was read in any read operation within the first cluster to determine whether the data encoded within the first barcode is able to be fully derived by combining portions of the data encoded within the first barcode that were read in read operations within the first cluster;

in response to a determination that the data encoded within the first barcode is able to be fully derived, refrain from generating the indication of lack of success, and provide the indication of the data encoded within the first barcode to another device; and in response to a determination that the data encoded within the first barcode is not able to be fully derived, proceed with generating the indication of lack of success.

9. The decoding device of claim 1, wherein the processor is further configured to perform operations comprising, in response to a lack of success in fully reading the data encoded within the first barcode, and in response to a lack of success in reading both the start end and the stop end of the first barcode, generate, as part of the set of indications of read failures, an indication of whether either of the start end or the stop end of the first barcode was successfully read in any read operation within the first cluster.

10. The decoding device of claim 9, wherein the processor is further configured to perform operations comprising:

generate a set of statistics indicative of at least relative proportions of read failures among the set of barcodes in which both the start end and the stop end were successfully read, read failures among the set of barcodes in which just the start end was successfully read, and read failures among the set of barcodes in which just the stop end was successfully read; and operate a display to visually present the set of statistics.

11. A decoding system comprising:

multiple cameras, wherein each camera comprises an image sensor configured to capture an image of multiple images of an object; and a processor communicatively coupled to the multiple cameras, the processor configured, for each image of the multiple images, to:

derive multiple read paths for multiple read operations to be attempted to read at least one barcode within a region of interest (ROI) based on at least one angle of orientation of the at least one barcode;

attempt each read operation of the multiple read operations within the ROI along a different one of the read paths of the multiple read paths to attempt to read data encoded within a single barcode of the at least one barcode;

analyze the read path of each read operation of the multiple read operations to identify a single cluster of read operations of the multiple read operations that are associated with attempts to read the single barcode;

add, to the single cluster, read operations associated with attempts to read the same single barcode within another ROI of another image of the multiple images;

analyze results of each read operation within the single cluster to identify each read operation in which data encoded within the single barcode was successfully fully read;

in response to at least one read operation within the single cluster resulting in the data encoded within the single barcode being successfully fully read, provide an indication of the data encoded within the single barcode to another device; and in response to a lack of success in fully reading the data encoded within the single barcode among the read operations within the single cluster, perform operations comprising:

for each read operation within the single cluster, analyze the results to determine whether a start end of the single barcode was successfully read, and to determine whether a stop end of the single barcode was successfully read; and store, as part of a set of indications of read failures in the storage for a set of barcodes that includes the single barcode, an indication of at least whether both the start end and the stop end of the single barcode were successfully read in any read operation within the single cluster.

12. The decoding system of claim 11, wherein deriving the multiple read paths comprises performing operations comprising:

derive a first subset of read paths that extend in parallel from a portion of a boundary of the ROI and into the ROI at a first angle of orientation that varies from the at least one angle of orientation of the at least one barcode to a first degree that falls within a pre-determined range of variation in angle; and derive a second subset of read paths that extend in parallel from the portion of the boundary of the ROI and into the ROI at a second angle of orientation that varies from the at least one angle of orientation of the at least one barcode to a second degree that falls within the pre-determined range of variation in angle.

13. The decoding system of claim 11, wherein analyzing the read path of each read operation of the multiple read operations to identify the single cluster of read operations comprises performing operations comprising:

separate the multiple read operations attempted within the ROI from other read operations attempted within another ROI within the image;

for each read operation of the multiple read operations attempted within the ROI, identify a subset of read operations of the multiple read operations that were attempted along read paths that each have an angle of orientation that is similar to the read paths of the other read operations within the subset within a pre-determined range of variation in angle; and define the single cluster of read operations as comprising the subset of read operations.

14. The decoding system of claim 11, wherein:

successfully reading the start end of the single barcode comprises successfully reading a start symbol encoded by lines at the start end of the single barcode; and successfully reading the stop end of the single barcode comprises successfully reading a stop symbol encoded by lines at the stop end of the single barcode.

15. A method comprising:

receiving, at a decoding device, image data from a first camera of a first image captured by the first camera of an object;

deriving, by the processor, multiple read paths for multiple read operations to be attempted to read at least one barcode within a first region of interest (ROI) based on the at least one angle of orientation of the at least one barcode;

attempting each read operation of the multiple read operations within the first ROI along a different one of the read paths of the multiple read paths to attempt to read data encoded within a first barcode of the at least one barcode;

analyzing, by the processor, the read path of each read operation of the multiple read operations to identify a first cluster of read operations of the multiple read operations that are associated with attempts to read the first barcode;

analyzing, by the processor, results of each read operation within the first cluster to identify each read operation in which data encoded within the first barcode was successfully fully read;

in response to at least one read operation within the first cluster resulting in the data encoded within the first barcode being successfully fully read, providing an indication of the data encoded within the first barcode to another device via a network; and in response to a lack of success in fully reading the data encoded within the first barcode among the read operations within the first cluster, performing operations comprising:

for each read operation within the first cluster, analyzing, by the processor, the results to determine whether a start end of the first barcode was successfully read, and to determine whether a stop end of the first barcode was successfully read; and storing, in a storage communicatively coupled to the processor, and as part of a set of indications of read failures for a set of barcodes that includes the first barcode, an indication of at least whether both the start end and the stop end of the first barcode were successfully read in any read operation within the first cluster.

16. The method of claim 15, wherein deriving the multiple read paths comprises:

deriving, by the processor, a first subset of read paths that extend in parallel from a portion of the boundary of the first ROI and into the first ROI at a first angle of orientation that varies from the at least one angle of orientation of the at least one barcode to a first degree that falls within a pre-determined range of variation in angle; and deriving, by the processor, a second subset of read paths that extend in parallel from the portion of the boundary of the first ROI and into the first ROI at a second angle of orientation that varies from the at least one angle of orientation of the at least one barcode to a second degree that falls within the pre-determined range of variation in angle.

17. The method of claim 15, wherein analyzing the read path of each read operation of the multiple read operations to identify the first cluster of read operations comprises:

separating the multiple read operations attempted within the first ROI from other read operations attempted within another ROI;

for each read operation of the multiple read operations attempted within the first ROI, identifying a subset of read operations of the multiple read operations that were attempted along read paths that each have an angle of orientation that is similar to the read paths of the other read operations within the subset within a pre-determined range of variation in angle; and defining the first cluster of read operations as comprising the subset of read operations.

18. The method of claim 15, further comprising, prior to analyzing the results of each read operation within the first cluster to identify each read operation in which data encoded within the first barcode was successfully read, performing operations comprising:

for each read operation within the first cluster, analyzing, by the processor, the results to identify a first largest successfully read portion of the data that is encoded within the first barcode;

for each read operation within a second cluster of read operations within a second ROI within the first image, analyzing, by the processor, results of each read operation within the second cluster to identify a second largest successfully read portion of the data that is encoded within a second barcode;

comparing a part of the first largest successfully read portion to a part of the second largest successfully read portion that the part of the first largest successfully read portion overlaps to determine whether the part of the first largest successfully read portion matches the part of the second largest successfully read portion;

comparing a first size of the overlapping parts of the first and second largest successfully read portions to a pre-defined minimum portion threshold to determine whether the first size at least meets the threshold; and in response to the first size meeting the threshold, and in response to the parts of the first and second largest successfully read portions matching, adding each of the read operations of the second cluster to the first cluster.

19. The method of claim 18, further comprising, prior to analyzing the results of each read operation within the first cluster to identify each read operation in which data encoded within the first barcode was successfully read, performing operations comprising:

for each read operation within a third cluster of read operations within a third ROI within a second image, analyzing, by the processor, results of each read operation within the third cluster to identify a third largest successfully read portion of the data that is encoded within a third barcode;

comparing another part of the first largest successfully read portion to a part of the third largest successfully read portion that the other part of the first largest successfully read portion overlaps to determine whether the other part of the first largest successfully read portion matches the part of the third largest successfully read portion;

comparing a second size of the overlapping parts of the third largest successfully read portion and the other part of the first largest successfully read portion to the pre-defined minimum portion threshold to determine whether the second size at least meets the threshold; and in response to the second size meeting the threshold, and in response to the part of the third largest successfully read portion matching the other part of the first largest successfully read portion, adding each of the read operations of the third cluster to the first cluster.

20. The method of claim 15, further comprising, in response to a lack of success in fully reading the data encoded within the first barcode, and in response to a lack of success in reading both the start end and the stop end of the first barcode, generating, as part of the set of indications of read failures, an indication of whether either of the start end or the stop end of the first barcode was successfully read in any read operation within the first cluster.

* * * * *